United States Patent
Yokosawa et al.

(10) Patent No.: US 9,363,007 B2
(45) Date of Patent: Jun. 7, 2016

(54) RELAY DEVICE AND METHOD OF ADJUSTING RELAY DEVICE

(71) Applicant: FUJITSU LIMITED, Kawasaki-shi, Kanagawa (JP)

(72) Inventors: Tadanori Yokosawa, Yokosuka (JP); Eiichi Ohyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/697,147

(22) Filed: Apr. 27, 2015

(65) Prior Publication Data

US 2015/0381261 A1    Dec. 31, 2015

(30) Foreign Application Priority Data

Jun. 26, 2014 (JP) ................................. 2014-131426

(51) Int. Cl.
| | | |
|---|---|---|
| *H04B 7/15* | (2006.01) | |
| *H04B 7/155* | (2006.01) | |
| *H04B 7/02* | (2006.01) | |
| *H04B 17/40* | (2015.01) | |

(52) U.S. Cl.
CPC ............ *H04B 7/15571* (2013.01); *H04B 7/026* (2013.01); *H04B 7/15585* (2013.01); *H04B 17/40* (2015.01)

(58) Field of Classification Search
CPC .......... H04W 72/0406; H04W 52/383; H04W 52/46; H04W 56/001; H04W 56/0015; H04W 76/028; H04W 84/045

USPC .............................. 455/11.1, 13.1, 41.2, 63.4
See application file for complete search history.

(56) References Cited

U.S. PATENT DOCUMENTS

| | | |
|---|---|---|
| 2006/0003697 A1 | 1/2006 | Asai et al. |
| 2008/0299898 A1 | 12/2008 | Moon |
| 2013/0336202 A1* | 12/2013 | Oh .................... H04B 7/155 370/315 |

FOREIGN PATENT DOCUMENTS

| | | |
|---|---|---|
| JP | 8-307136 A | 11/1996 |
| JP | 11-274962 A | 10/1999 |
| JP | 2000-286772 A | 10/2000 |
| JP | 2006-20211 A | 1/2006 |
| JP | 2009-521889 A | 6/2009 |

* cited by examiner

*Primary Examiner* — Tu X Nguyen
(74) *Attorney, Agent, or Firm* — Arent Fox LLP

(57) ABSTRACT

A relay device in a system in which a transmission signal of a base station is relayed via a plurality of relay devices, includes: a first antenna configured to receive the transmission signal; a second antenna configured to communicate a target relay device being a relay destination relay device for the transmission signal; a communication unit configured to perform notification of setting information of the first and second antennas to other relay devices including the target relay device, and communication for acquiring setting information of the other relay devices; and an analysis unit configured to analyze a cause of a relay status lower than a criterion when the relay status of the transmission signal is lower than the criterion.

10 Claims, 20 Drawing Sheets

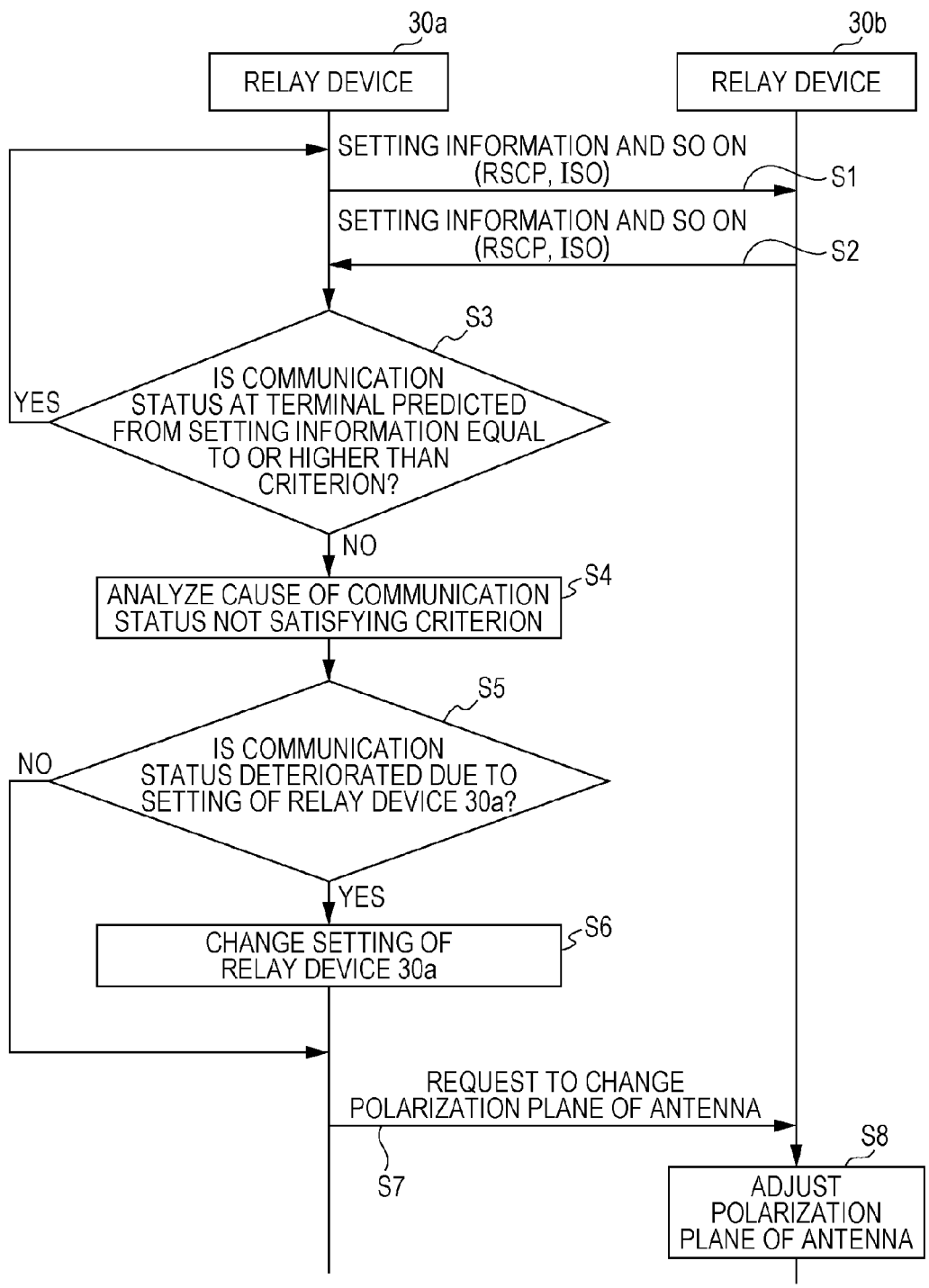

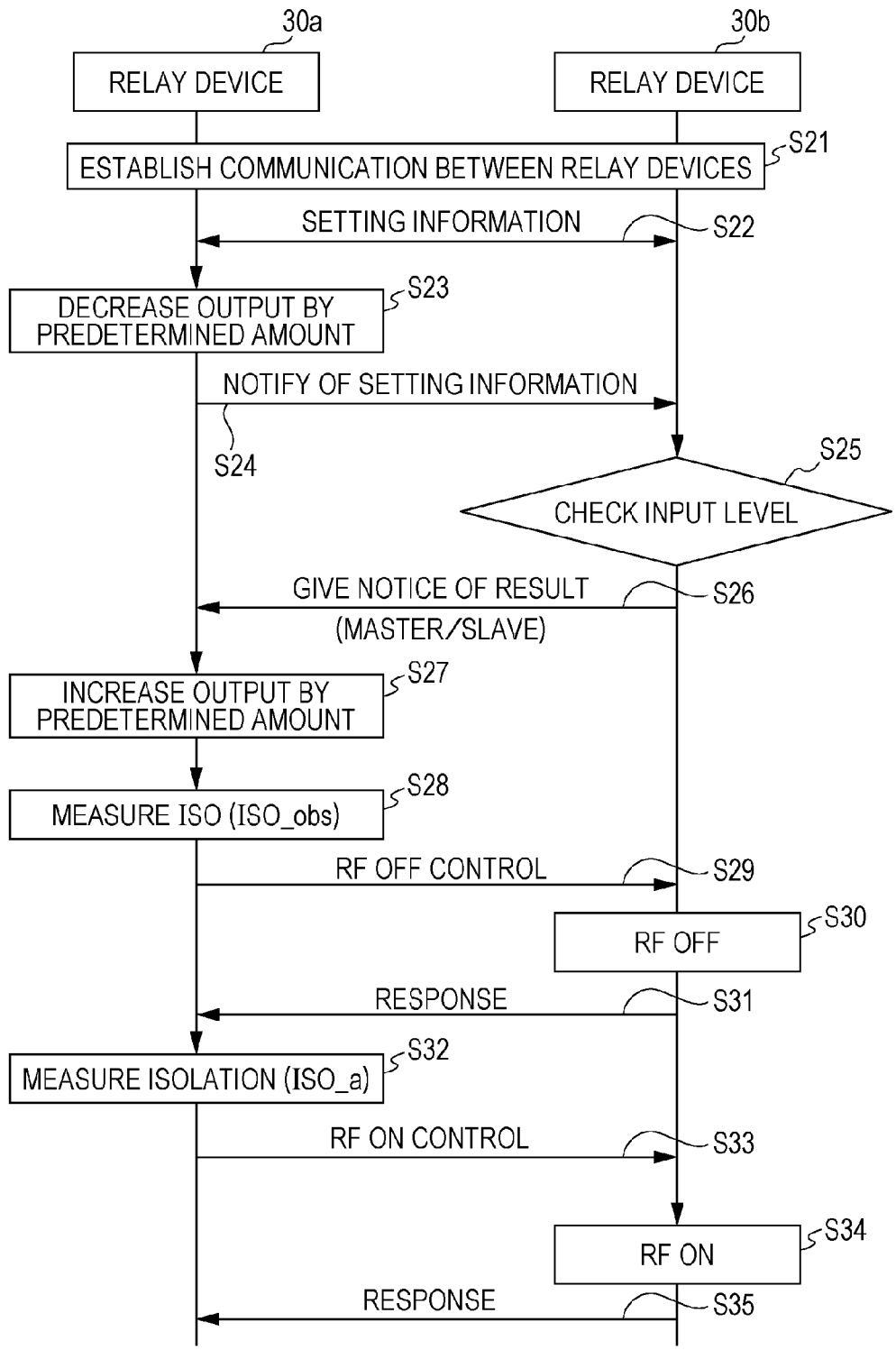

FIG. 6

| INSTALLATION INFORMATION | MS ANTENNA POLARIZATION INFORMATION | BS ANTENNA POLARIZATION INFORMATION | ISOLATION BETWEEN ANTENNAS | SET GAIN | DL OUTPUT POWER | RSCP MEASURED VALUE | UL INPUT POWER | ISOLATION BETWEEN RELAY DEVICES | CONTROL | RESPONSE |
|---|---|---|---|---|---|---|---|---|---|---|

F1

| INFORMATION ELEMENT | VALUE RANGE |
|---|---|
| INSTALLATION INFORMATION | 1: MASTER STATION<br>2: SLAVE STATION |
| CONTROL | 1: RF OFF<br>2: RF ON<br>3: SETTING VALUE CONTROL<br>4: STANDBY CONTROL<br>5: ADJUSTMENT OF MS ANTENNA POLARIZATION PLANE<br>6: CHANGE OF POLARIZED WAVE OF MS ANTENNA<br>7: ADJUSTMENT OF BS ANTENNA AND MS ANTENNA |
| RESPONSE | 1: CONTROL ACKNOWLEDGE (ACK)<br>2: CONTROL COMPLETION<br>3: CONTROL NG |

T1

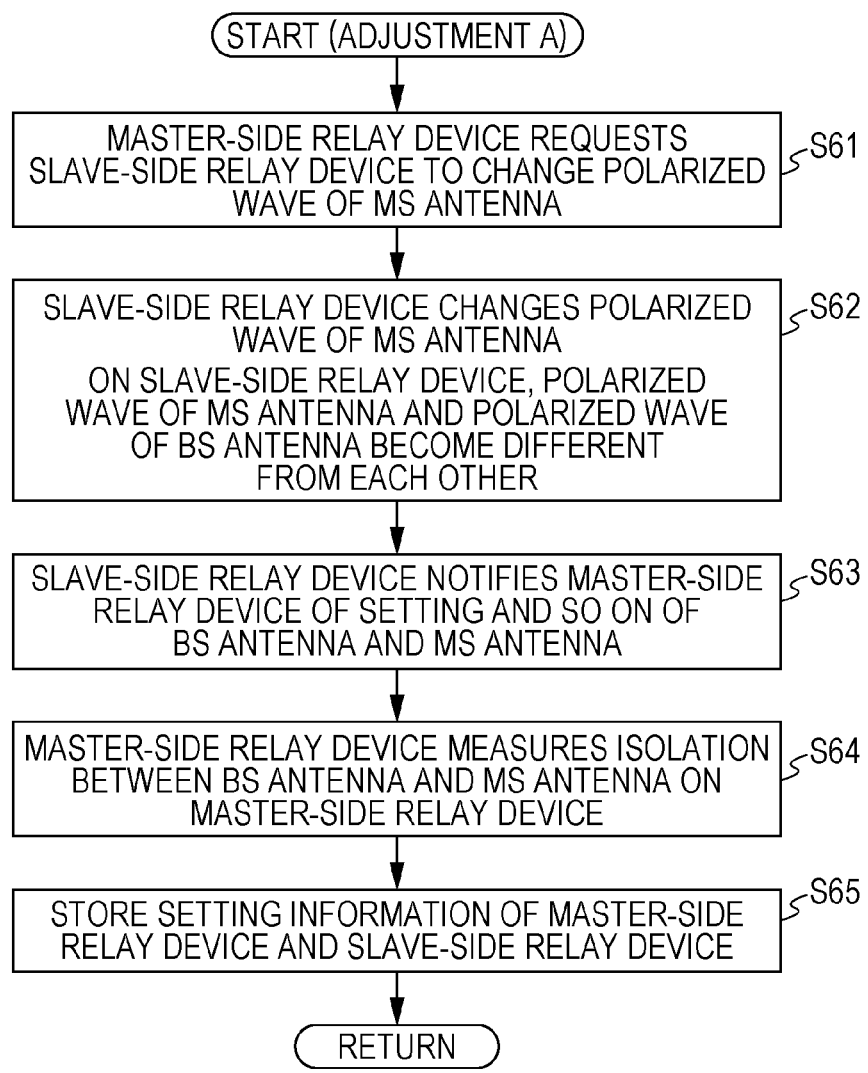

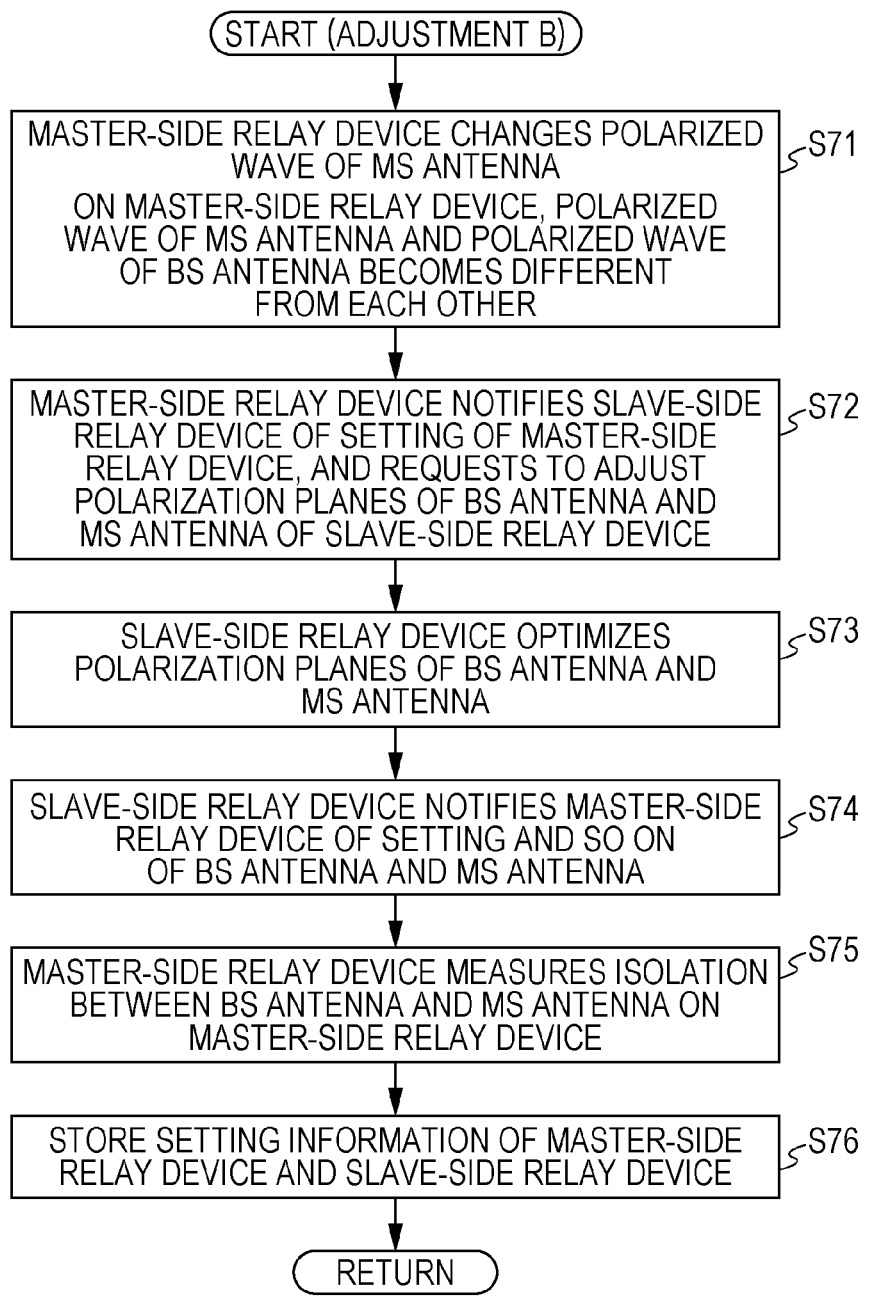

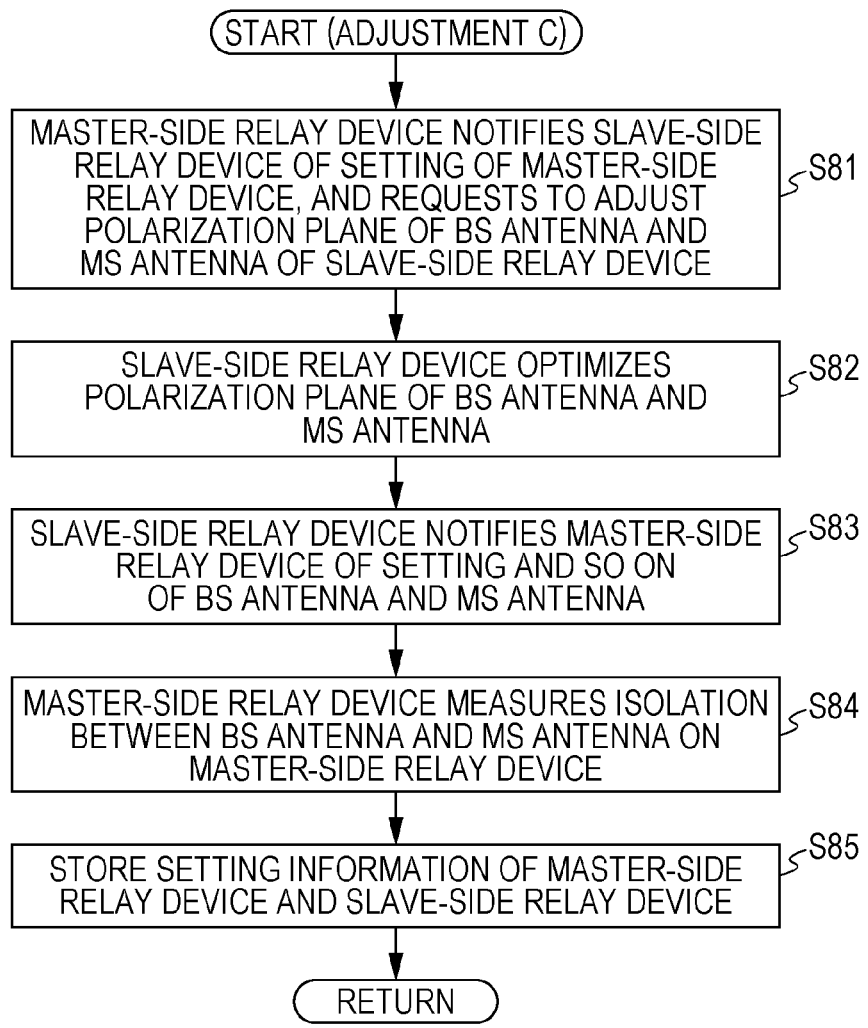

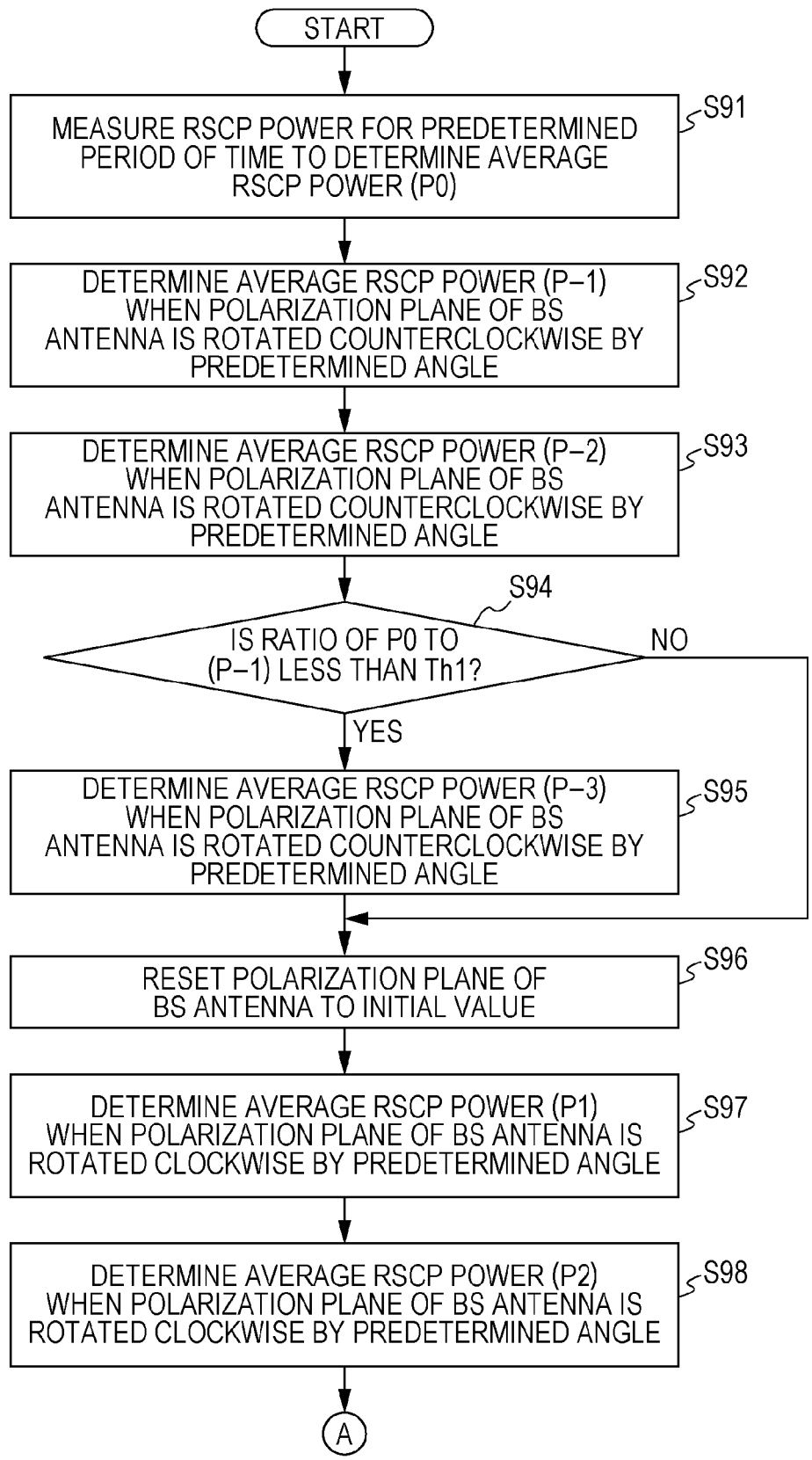

RELAY DEVICE AND METHOD OF ADJUSTING RELAY DEVICE

CROSS-REFERENCE TO RELATED APPLICATION

This application is based upon and claims the benefit of priority of the prior Japanese Patent Application No. 2014-131426, filed on Jun. 26, 2014, the entire contents of which are incorporated herein by reference.

FIELD

The embodiments discussed herein are related to a relay device which relays radio signals.

BACKGROUND

A relay device called a repeater or the like may be installed for improving communication quality in the radio communication and expanding the service area. The relay device receives a signal transmitted from a base station, and amplifies and relays the signal to a terminal, allowing the terminal to communicate even at an area where a radio wave from the base station hardly reaches. The relay device also amplifies and transmits a transmission signal of the terminal to the base station. The number of relay devices included in a communication path between the base station and the terminal is optional.

As a related art, a relay device is known that variably selects one polarization direction of at least one antenna according to the isolation between a donor antenna which transmits and receives signals to and from the base station and a service antenna which transmits and receives signals to and from a mobile station (for example, Japanese National Publication of International Patent Application No. 2009-521889). Also, a satellite automatic tracking antenna is known that rotatably drives, according to the reception signal level, a linear polarization flat antenna and a beam reflector plate which reflects an antenna beam of the flat antenna in the direction of satellite elevation angle (for example, Japanese Laid-Open Patent Publication No. 8-307136). Also proposed is a technique which suppresses sneaking of a signal from a transmission antenna to a reception antenna by adjusting the gain of a second antenna group in the direction of a first antenna group in a relay device comprising the first antenna group and the second antenna group (for example, Japanese Laid-Open Patent Publication No. 2006-020211). Also proposed is a control method of increasing the gain within a range where no oscillation occurs, based on the difference between an input wave and a sneaking wave by synthesizing a cancellation wave canceling the sneaking wave into the input wave and the sneaking wave in a relay device (for example, Japanese Laid-Open Patent Publication No. 2000-286772). Also a technique of adjusting the polarization angle of the demultiplexer based on the level of a vertical beacon signal and a horizontal beacon signal in a converter incorporating the demultiplexer is known (for example, Japanese Laid-Open Patent Publication No. 11-274962).

When communication between a base station and a terminal is relayed via multiple relay devices, a radio wave transmitted from a certain relay device may sneak to a reception antenna other than a relay device at the relay destination. A relay device with a reception antenna to which a transmission wave sneaks reduces the transmission gain to mitigate interference. As a result, an area covered by the relay device is narrowed. Sneaking of the radio wave among multiple relay devices is difficult to be mitigated by any of the related arts.

SUMMARY

According to an aspect of the embodiments, a relay device in a system in which a transmission signal of a base station is relayed via a plurality of relay devices, includes: a first antenna configured to receive the transmission signal; a second antenna configured to communicate a target relay device being a relay destination relay device for the transmission signal; a communication unit configured to perform notification of setting information of the first and second antennas to other relay devices including the target relay device, and communication for acquiring setting information of the other relay devices; and an analysis unit configured to analyze a cause of a relay status lower than a criterion when the relay status of the transmission signal is lower than the criterion, the communication unit transmitting, to the target relay device, a request signal requesting adjustment of polarization planes of antennas connected with the target relay device when setting of the target relay device is the cause.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1B illustrate examples of the adjustment method according to the embodiment;

FIG. 5 is a sequence diagram for illustrating an example of a method of determining the relay device which determines a timing for the antenna adjustment;

FIG. 6 is a diagram for illustrating an example of information elements contained in a signal used in the communication;

FIG. 8 is a flowchart for illustrating an example of an adjustment involving a change of the polarized wave used on a slave-side relay device;

FIG. 9 is a flowchart for illustrating an example of an adjustment involving a change of the polarized wave used on a master-side relay device;

FIG. 10 is a flowchart for illustrating an example of adjusting a polarization plane on a slave-side relay device;

FIG. 11A is a flowchart for illustrating an example of an adjustment method of a BS antenna;

DESCRIPTION OF EMBODIMENTS

Figure 1A:
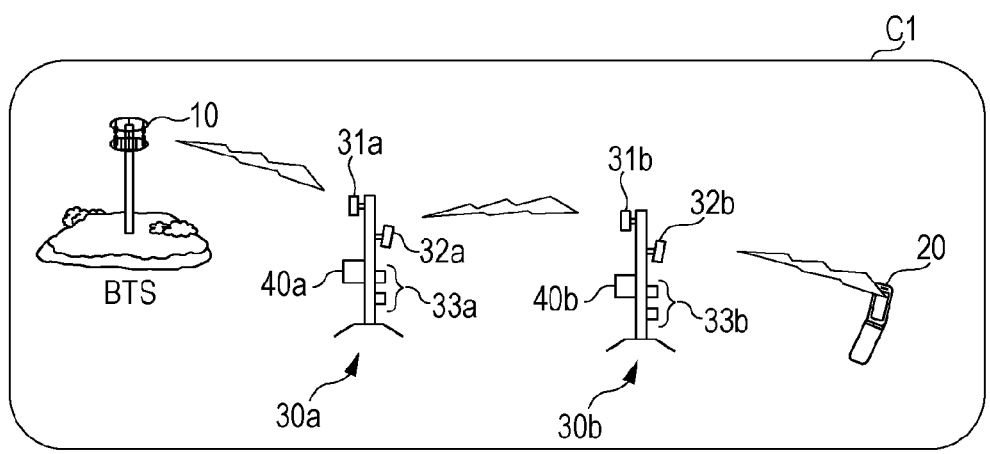
FIG. 1A illustrate examples of an adjustment method according to an embodiment.

FIG. 1A illustrates an example of an adjustment method according to the embodiment. An example of a system to which an adjustment method according to the embodiment is applied is illustrated in Case C1 of FIG. 1A. In the example of Case C1, a base station 10 and a terminal 20 are in communication with each other via relay devices 30a and 30b. Each of the relay devices includes an antenna used for communication with a device on the side of the base station, an antenna used for communication with a device on the side of the terminal, a repeater 40, and an uninterruptible power supply 33. Hereinafter, the antenna used for communication with a device on the side of the base station may be referred to as a BS antenna 31, and the antenna used for communication with a device on the side of the terminal may be referred to as a MS antenna 32. In Case C1, the relay device 30a receives a signal transmitted from the base station 10 via a BS antenna 31a, and transmits the received signal through a MS antenna 32a by amplifying as appropriate. The relay device 30b receives a signal transmitted from the relay device 30a via a BS antenna 31b, and transmits the received signal through a MS antenna 32b by amplifying as appropriate. Thus, the terminal 20 receives the signal transmitted from the base station 10 via the relay devices 30a and 30b. Similarly, the transmission signal of the terminal 20 is transmitted to the base station 10 via the relay devices 30a and 30b.

FIG. 1B illustrates an example of a method of adjusting an antenna by each relay device 30 in the system illustrated in the communication Case C1. Each relay device 30 includes an antenna available for communication in addition to the BS antenna 31 and the MS antenna 32, the antenna enabling communication such as transmission and reception of control information therethrough. As illustrated in a sequence diagram of FIG. 1B, the relay device 30a notifies setting information and the like of the antenna of the relay device 30a to the relay device 30b (step S1). Similarly, the relay device 30b notifies setting information and the like of the antenna of the relay device 30b to the relay device 30a (step S2). In the example of FIG. 1A, the antenna setting on the side of transmission source relay devices 30a and 30b, the received signal code power (RSCP), the antenna-to-antenna isolation, and so on are notified as the setting information, and the like.

The relay device 30a predicts communication status at the terminal 20 by using notified setting information, and determines whether predicted communication status is equal to or higher than a criterion (step S3). If the predicted communication status is equal to or higher than the criterion, the relay device 30a returns to step S1. On the other hand, if the predicted communication status is lower than the criterion, the relay device 30a analyzes the cause of the predicted communication status lower than the criterion (step S4, if No at step S3). This analysis determines, for example, how the transmission wave sneaks to the relay device 30b, whether RSCP of the relay device 30a is low, whether isolation between the BS antenna 31b and the MS antenna 32b of the relay device 30b is deteriorated, and so on. If RSCP of the relay device 30a is equal to or lower than a predetermined value, the relay device 30a determines that communication status at the terminal 20 is lower than the criterion. Also, when sneaking of the transmission wave to the relay device 30b exceeds a predetermined level or when isolation at the relay device 30b is lower than a predetermined value, the relay device 30a determines that communication status at the terminal 20 is lower than the criterion.

If deterioration of the communication status is due to the setting at the relay device 30a, the relay device 30a changes the setting of an antenna of the relay device 30a and so on (step S6, if Yes in step S5). Then, the relay device 30a requests the relay devices 30b to change the polarization planes of antennas (step S7). On the other hand, if deterioration of the communication status is due to the setting at the relay device 30b, the relay device 30a also requests the relay device 30b to change the polarization planes of antennas (step S7, if No in step S5). In response to the notification from the relay device 30a, the relay device 30b performs adjustment of the BS antenna 31b or the MS antenna 32b included in the relay device 30b as appropriate. Examples described with reference to FIGS. 1A and 1B are for explanatory purpose. Communication between the base station 10 and the terminal 20 may be relayed via three or more relay devices 30.

Thus, in the method according to the embodiment, one of multiple relay devices 30 may determine, by using setting information acquired from other relay devices 30, whether communication status at the terminal 20 is lower than the criterion. Further, when determined that adjustment of an antenna at the relay device 30 from which setting information is notified is effective to improve communication status of the terminal 20, the determining relay device 30 requests the relay device 30 from which the setting information is notified to change the polarization plane of the antenna. In other words, a relay device 30 may request another relay device 30 to adjust the antenna according to predict result of communication status at the terminal 20. Since the relay device 30 which is requested to adjust the antenna optimizes the polarization plane of the antenna, communication status in a system including multiple relay devices is easily improved. Although in the example described with reference to FIGS. 1A and 1B, antenna adjustment is performed according to the predicted communication status at the terminal 20, the communication status at the terminal 20 may be said to be, in other words, a communication status of a signal via a relay destination relay device 30.

Since antenna adjustment at the other relay device 30 is performed at the request of a certain relay device 30, autonomous antenna adjustment is performed within the system in real time according to a change in the status of the propagation path. Accordingly, in a system to which the method according to the embodiment may be applied, a change in the status of the propagation path can be addressed easily.

<Device Configuration>

Figure 2:
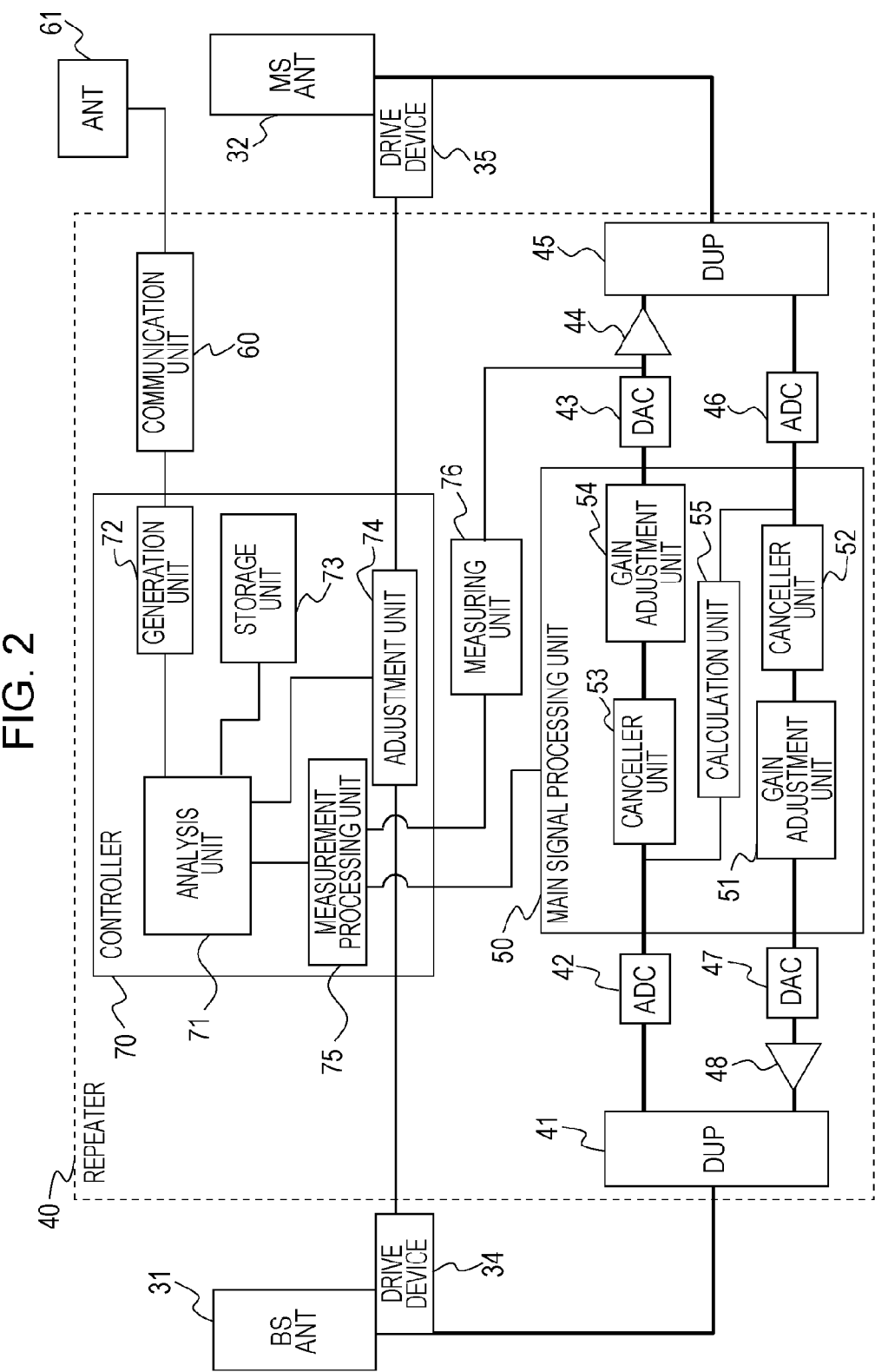
FIG. 2 illustrates a configuration example of a relay device.

FIG. 2 illustrates a configuration example of the relay device 30. The relay device 30 includes a BS antenna 31, a MS antenna 32, an uninterruptible power supply 33 (see FIG. 1A), a drive device 34, a drive device 35, a repeater 40, and an antenna 61.

The drive device 34 changes the polarization plane of the BS antenna 31 by changing the installation direction of the BS antenna 31. The drive device 35 changes the polarization plane of the MS antenna 32 by changing the installation direction of the MS antenna 32. The drive device 34 and the drive device 35 are optional drive devices which can be used for changing the direction of the antenna such as, for example, a turntable of the antenna.

The repeater 40 includes duplexers (41, 45), A/D converters (42, 46), D/A converters (43, 47), amplifiers (44, 48), a main signal processing unit 50, a controller 70, a measuring unit 76, and a communication unit 60. The duplexer 41 is configured to select a signal outputted to the BS antenna 31, and the duplexer 45 is configured to select a signal outputted to the MS antenna 32.

The main signal processing unit 50 includes a gain adjustment unit 51, a canceller unit 52, a canceller unit 53, a gain adjustment unit 54, and a calculation unit 55. The gain adjustment unit 51 is configured to adjust gain of the BS antenna 31, and the gain adjustment unit 54 is configured to adjust gain of the MS antenna 32. Each of the canceller unit 52 and the canceller unit 53 perform synthesis processing of the cancellation wave. The calculation unit 55 is configured to calculate the isolation between the BS antenna 31 and the MS antenna 32.

The communication unit 60 is configured to transmit and receive setting information and control information for antenna adjustment between relay devices 30. The communication unit 60 communicates via the antenna 61. Communication between the communication unit 60 and the antenna 61 is performed with a frequency not affecting communication using the BS antenna 31 or the MS antenna 32.

The controller 70 includes an analysis unit 71, a generation unit 72, a storage unit 73, an adjustment unit 74, and a measurement processing unit 75. The analysis unit 71 predicts whether communication status at the terminal 20 is equal to or lower than the criterion, by using information such as the isolation calculated by the calculation unit 55, and setting information notified by other relay devices 30. Further, when determined that communication status at the terminal 20 is possibly equal to or lower than the criterion, the analysis unit 71 analyzes the cause of the deteriorated communication status. When determined that setting of the relay device thereof may deteriorate the communication status, the analysis unit 71 requests the adjustment unit 74 to adjust the BS antenna 31 or the MS antenna 32. When changed the setting of the relay device thereof or when determined that the setting of the other relay device 30 deteriorates the communication status, the analysis unit 71 notifies the analysis result to the generation unit 72. In response to the notification from the analysis unit 71, the generation unit 72 generates a request signal for requesting the relay device 30 from which the setting information is notified to change the polarization plane of the antenna. The request signal is transmitted via the communication unit 60 and the antenna 61. The storage unit 73 stores information used by the controller 70 as appropriate. The measurement processing unit 75 requests the measuring unit 76 and the calculation unit 55 at a predetermined cycle to calculate the RSCP and the isolation. The measurement processing unit 75 also changes the output power and adjusts a timing to change the output power. The measuring unit 76 measures the RSCP from a device on the side of the base station. The communication status at the terminal 20 has the same meaning as a relay status at a relay device through which the signal is relayed.

Figure 3:
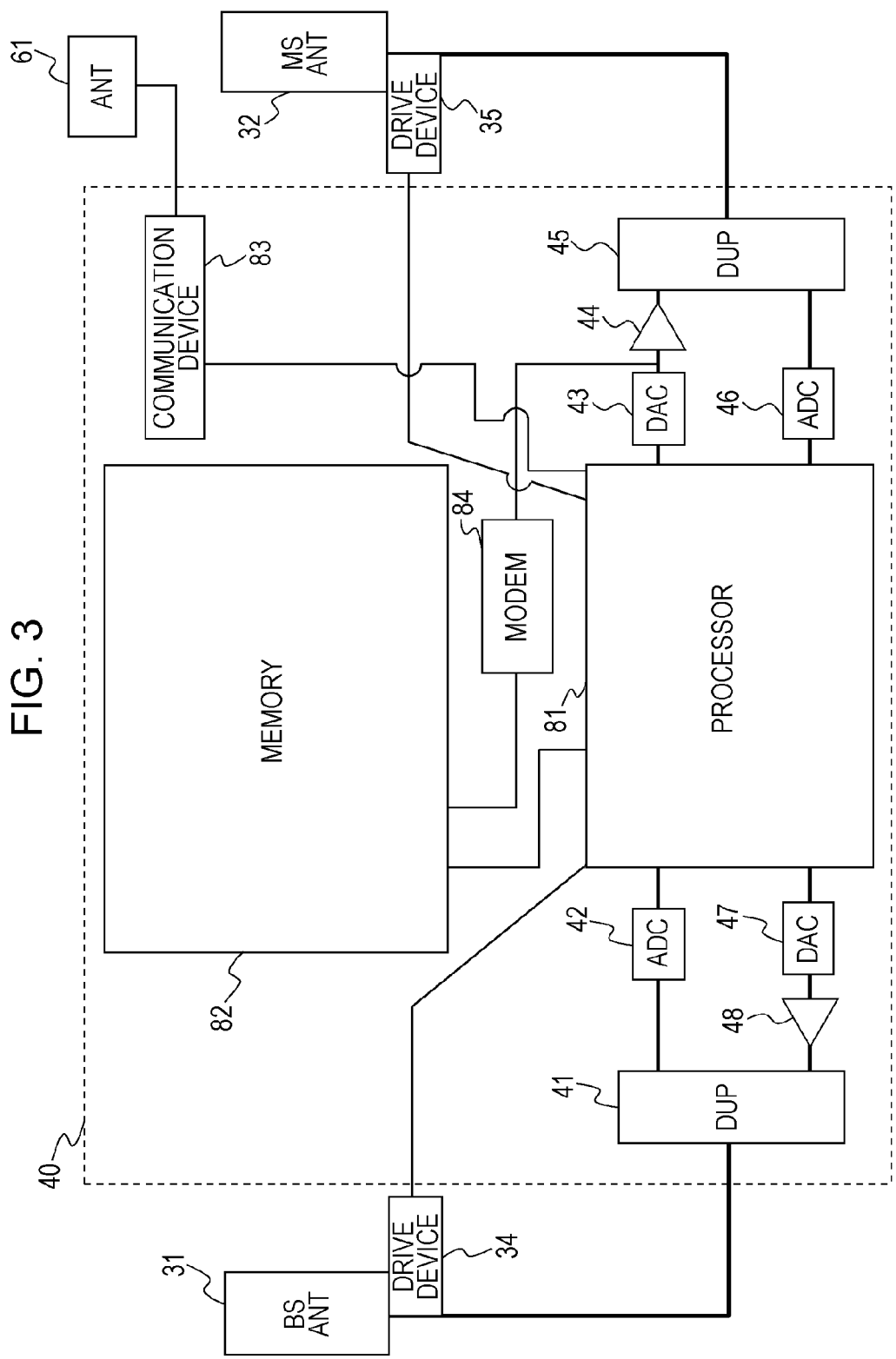
FIG. 3 illustrates a hardware configuration example of the relay device.

FIG. 3 illustrates a hardware configuration example of the relay device 30. The relay device 30 includes a processor 81, a memory 82, a communication device 83, and a modem 84. The relay device 30 further includes a BS antenna 31, a MS antenna 32, drive devices (34, 35), duplexers (41, 45), A/D converters (42, 46), D/A converters (43, 47), and amplifiers (44, 48). The processor 81 serves as the main signal processing unit 50, the analysis unit 71, the generation unit 72, the adjustment unit 74, and the measurement processing unit 75. The memory 82 serves as the storage unit 73. The modem 84 serves as the measuring unit 76. The communication device 83 is a communication device such as, for example, a wireless fidelity (WiFi) communication device, and serves as the communication unit 60. Although the relay device 30 described with reference to FIG. 3 includes the modem 84, the measuring unit 76 can be implemented by an optional measuring device capable of performing RSCP measurement.

In the first embodiment, an example of an adjustment method performed when starting or installing relay devices 30 in a communication system is described. In the example described below, adjustment is performed in the order from a relay device 30 installed closer to the base station 10 within the communication system. That is, in the system illustrated in Case C1 of FIG. 1A, adjustment is performed in the order of the BS antenna 31a of the relay device 30a, the MS antenna 32a of the relay device 30a, the BS antenna 31b of the relay device 30b, and the MS antenna 32b of the relay device 30b. In the following example, a case in which antennas included in each relay device are preferentially set to the H polarization is described as an example.

Figure 4:
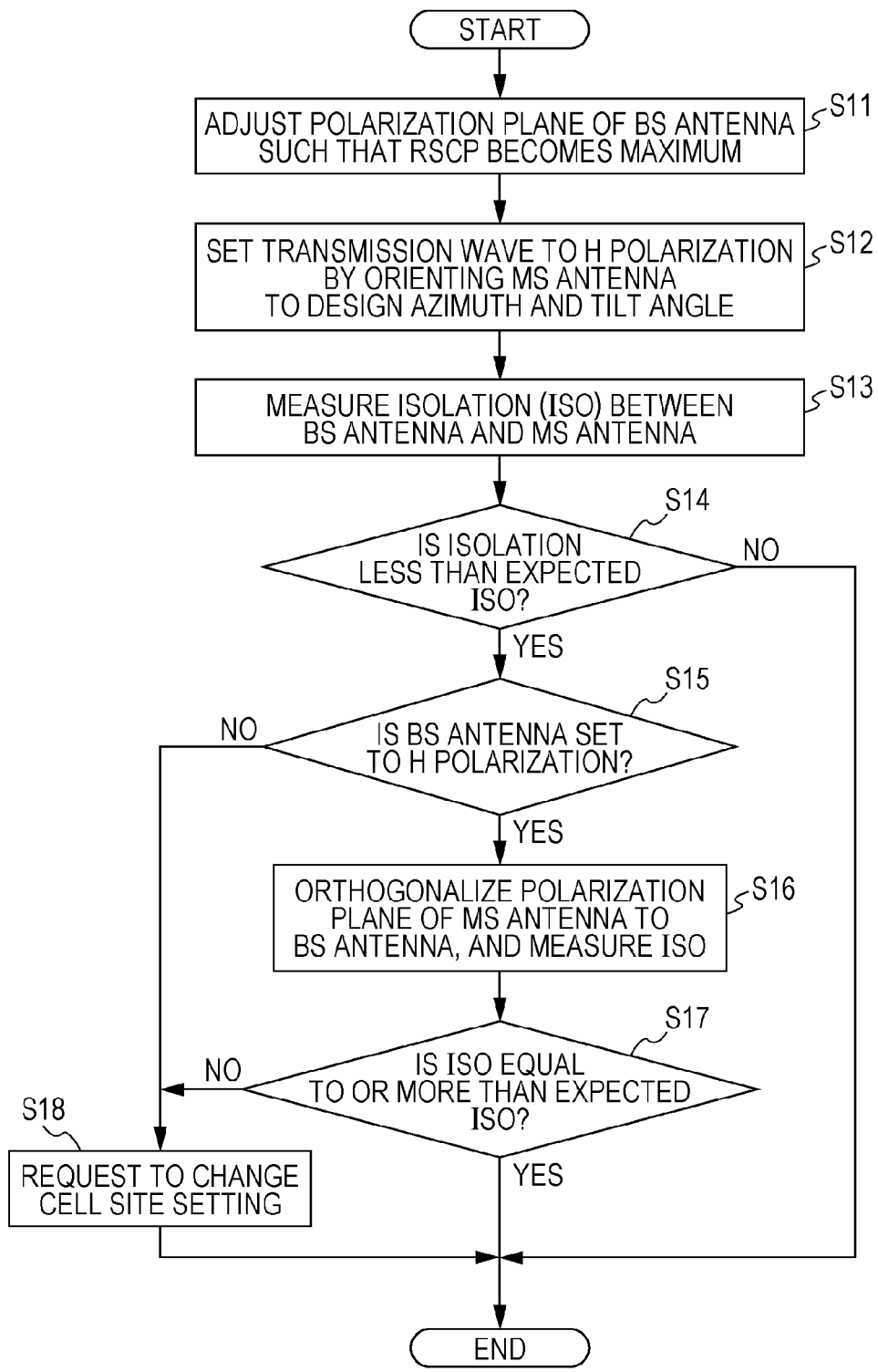
FIG. 4 is a flowchart for illustrating an example of a start-up processing of the relay device.

FIG. 4 is a flowchart for illustrating an example of a start-up processing of the relay device 30. In the example of FIG. 4, processing performed when the transmission wave from the base station 10 is the V polarization is described. The transmission wave from the base station 10 may be the H polarization. If the transmission wave from the base station 10 is the H polarization, step S15 determines whether the BS antenna is the V polarization.

In step S11, the adjustment unit 74 adjusts the polarization plane of the BS antenna 31 such that RSCP becomes maximum. At that time, the relay device 30a is adjusted such that reception power from the base station 10 becomes maximum, and the relay device 30b is adjusted such that reception power from the relay device 30a becomes maximum.

In step S12, the adjustment unit 74 sets the transmission wave to the H polarization by orienting the MS antenna 32 to a predetermined design azimuth and tilt angle. Information on the design azimuth and tilt angle is prestored in the storage unit 73. The adjustment unit 74 reads information on the design azimuth and tilt angle from the storage unit 73 as appropriate.

In step S13, the calculation unit 55 measures isolation (ISO) between the BS antenna 31 and the MS antenna 32 of the relay device thereof. Calculation result of the calculation unit 55 is outputted to the adjustment unit 74. The adjustment unit 74 determines whether the isolation is less than the expected ISO (step S14). Here, the "expected ISO" is a predetermined constant which is bigger than the maximum gain. For example, the expected ISO can be set to the sum of the maximum gain and a maximum value of the sneaking wave which can be canceled by canceller units 52, 53. Assume that the adjustment unit 74 prestores the expected ISO. If the determined isolation is equal to or more than the expected ISO, the adjustment unit 74 ends adjustment of the BS antenna 31 and the MS antenna 32 (No in step S14).

On the other hand, if the determined isolation is less than the expected ISO, the adjustment unit 74 determines whether the BS antenna 31 is set to the H polarization (step S15). If the BS antenna 31 is set to the H polarization, the adjustment unit 74 orthogonalizes the polarization plane of the MS antenna 32 to the BS antenna 31, and causes the calculation unit 55 to measure the isolation (step S16, if Yes in step S15). If the determined isolation is equal to or more than the expected ISO, the adjustment unit 74 ends adjustment of the BS antenna 31 and the MS antenna 32 (Yes in step S17). If determined that the BS antenna 31 is not set to the H polarization, the adjustment unit 74 requests change of the cell site setting (step S18). Request for change of the cell site setting is selected from an optional processing capable of notifying the operator, by displaying the request on a display device (not shown) or the like, that change of the cell site setting is requested, according to the implementation. Further, even if determined in step S17 that the isolation is less than the expected ISO, the adjustment unit 74 requests change of the cell site (step S18).

Each relay device 30 in the communication system adjusts antennas during startup by a processing described with reference to FIG. 4. Thus, each relay device 30 can set the polarization plane of the MS antenna 32 according to the setting of the BS antenna 31 thereof such that the isolation therein becomes equal to or more than the expected ISO. When each relay device 30 activates, a processing for securing the isolation between a BS antenna 31 and a MS antenna 32 installed on a different relay device 30 starts.

FIG. 5 is a sequence diagram for illustrating an example of a method of determining a relay device 30 which determines a timing of the antenna adjustment. In the description below, "master-side relay device" refers to a relay device 30 which determines a timing of antenna adjustment and an antenna to be adjusted, among relay devices installed adjacent to each other. On the other hand, "slave-side relay device" refers to a relay device which performs a specified antenna adjustment in response to the request from the master-side relay device. Hereinafter, the master-side relay device is a device which relays a reception signal received from the base station 10 to the slave-side relay device. In the description below, positioning of multiple relay devices 30 at a distance in which signals can be transmitted and received therebetween is referred to as "adjacent". Thus, in the case illustrated in C1 of FIG. 1A, the relay device 30b is adjacent to the relay device 30a, since the relay device 30b is a signal relay destination for the relay device 30a. On the other hand, the relay device 30a is adjacent to the relay device 30b, since the relay device 30a is a signal relay source for the relay device 30b. Further, in the description below, to facilitate discrimination, a processing device may carry a reference numeral whose last digit is represented by an alphanumeric character assigned to an operating relay device 30. For example, the analysis unit 71a indicates the analysis unit 71 included in the relay device 30a.

Assume that communication between the relay device 30a and the relay device 30b via the communication unit 60 or the antenna 61 has been established in step S21. The communication via the communication unit 60 or the antenna 61 is an optional communication not affecting relay of a communication via the BS antenna 31 or the MS antenna 32, and, for example, the WiFi ad hoc mode can be used therein. Each of the relay device 30a and the relay device 30b notifies the other of the setting information by communicating via the communication unit 60 (step S22). The communication unit 60 stores information notified by a communication destination relay device 30 into the storage unit 73 along with the reception time. At that time, the communication unit 60 in each relay device 30 also retains the content of the signal previously received from the same transmission source.

FIG. 6 is a diagram for illustrating an example of information elements contained in a signal used in the communication. The relay device 30 transmits a signal (frame) containing information elements illustrated in F1 plus notification destination information of the information elements to an adjacent relay device 30. The signal used for communication between relay devices 30 contains information indicating the status of a transmission source relay device 30, information notified from a master-side relay device to a slave-side relay device, and response from the slave-side relay device to the master-side relay device. Although the generation unit 72 generates a signal for notifying setting information, an item which is not determined by a relay device 30 generating a signal contains an invalid value.

Information indicating the status of the signal transmission source relay device 30 includes installation information, polarized wave information on the BS antenna 31, polarized wave information on the MS antenna 32, isolation between antennas, set gain, downlink (DL) output power, RSCP measured value, and uplink (UL) input power. Setting information indicates whether a transmission source relay device 30 is a master relay device or a slave relay device relative to a signal destination relay device 30. As illustrated in Table T1 of FIG. 6, installation information=1 used hereinafter indicates that the transmission source relay device operates as a master-side relay device relative to the destination relay device 30. On the other hand, installation information=2 used hereinafter indicates that the transmission source relay device operates as a slave-side relay device relative to the destination relay device 30. Further, when the transmission source relay device is not determined to be either a master or a slave relative to the destination relay device, installation information is set to 0. Polarized wave information on the BS antenna 31 and the MS antenna 32 is represented by a rotation angle from the reference position which is a predetermined direction. In the description below, the rotation angle of each antenna is represented, for example, with the vertical direction as 0 degree, and the clockwise direction as a positive value. The set gain is a value of the gain being set in the transmission source relay device 30.

The DL output power is an output power for the transmission source relay device 30 to perform transmission in a direction where the terminal 20 is positioned. The measured RSCP value is the intensity of a predetermined control signal which the transmission source relay device 30 receives from a device on the side of the base station 10. For example, each relay device 30 may use reception intensity of a pilot signal as the measured RSCP value. A signal other than the pilot signal may be used as a specific control signal used for the RSCP measurement. The UL input power is a power which the transmission source relay device 30 receives from a direction where the base station 10 is positioned. The UL input power includes the measured RSCP value and a signal caused by user's communication.

In the example of F1, isolation between relay devices 30, and control details are notified as information notified from the master-side relay device to the slave-side relay device. As illustrated in Table T1 of FIG. 6, in the description below, control=1 indicates stop of signal input to the radio frequency (RF) circuit. Here, the RF circuit is a circuit used for a communication with the BS antenna 31 and the MS antenna 32. Control=2 represents start of signal input to the RF circuit, control=3 represents setting request to a designated setting value, and control=4 represents wait request. Control=5 indicates adjustment of the polarization plane of the MS antenna 32 to an extent not involving a change of the polarized wave of the MS antenna 32, and control=6 indicates adjustment of the polarization plane involving a change of the polarized wave of the MS antenna 32. Control=7 indicates adjustment of the polarization plane involving a change of the polarized wave of the BS antenna 31, and adjustment of the polarization plane of the MS antenna 32 in accordance with adjustment results of the BS antenna 31.

As the response information in F1, information representing a response from the slave-side relay device to the master-side relay device is stored. Response information=1 indicates that the slave-side relay device has successfully identified the content of a control requested by the master-side relay device. On the other hand, response information=2 indicates that the control requested by the master-side relay device has completed on the slave-side relay device, and response information=3 indicates that the control requested by the master-side relay device is not available on the slave-side relay device.

Since the master-side relay device and the slave-side relay device notify setting information such as the output power to each other as described with reference to FIG. 6 in step S22 of FIG. 5, the relay device 30b stores the output power of the relay device 30a. Assume that the measurement processing unit 75a of the relay device 30a then reduces the output power by a predetermined amount (step S23).

In step S24, the generation unit 72a of the relay device 30a generates a notification signal including setting information=0 and a changed value of output power to notify the relay device 30b of the setting information on the relay device 30a. In the notification signal generated by the generation unit 72a, the isolation between relay devices 30 is also set to 0. The generation unit 72a transmits the generated notification signal to the relay device 30b via the communication unit 60a and the antenna 61a.

The communication unit 60b of the relay device 30b updates information of the storage unit 73b by using information received from the relay device 30a, and notifies the analysis unit 71b that the information has been updated. Upon receiving notification of the installation information=0 and change of the output power, the analysis unit 71b requests the measuring unit 76b to measure RSCP of the BS antenna 31 (step S25). The analysis unit 71b compares the measured value determined by the measuring unit 76b with the value of RSCP measured before the output power of the relay device 30a is changed. Here, if the relay device 30b is positioned closer to the base station 10 than the relay device 30a, there is no fluctuation of RSCP on the relay device 30b resulting from the change of the output power on the relay device 30a. On the other hand, if the relay device 30b is positioned closer to the terminal 20 than the relay device 30a, the measured value of RSCP on the relay device 30b fluctuates in conjunction with the change of the output power on the relay device 30a. Here, assume that RSCP of the BS antenna 31b on the relay device 30b decreases as the output power of the relay device 30a decreases. Then, the analysis unit 71b determines that the relay device 30b serves as a slave-side relay device which is a relay destination of the transmission signal from the base station 10 to the relay device 30a. The analysis unit 71b notifies the determination result to the generation unit 72b. The generation unit 72b generates a result notification signal including information (installation information=2) indicating that the relay device 30b is a slave-side relay device, and transmits to the relay device 30a via the communication unit 60b and the antenna 61b (step S26).

The communication unit 60a of the relay device 30a updates information of the storage unit 73a by using result notification signal received from the relay device 30b, and notifies the analysis unit 71a that the information has been updated. Since the result notification signal received from the relay device 30b contains information (installation information=2) indicating that the relay device 30b is a slave-side relay device 30, the analysis unit 71a determines that the relay device 30a is a master-side relay device relative to the relay device 30b. The analysis unit 71a requests the measurement processing unit 75a to reset the output power to a setting value. In response to the request of the analysis unit 71a, the measurement processing unit 75a increases the output power by a predetermined amount (step S27).

In step S28, the analysis unit 71a acquires, from the calculation unit 55a, a calculation result of the isolation (ISO_obs) between the BS antenna 31a and the MS antenna 32a. Here, ISO_obs is isolation determined when the BS antenna 31b and the MS antenna 32b are operating in the relay device 30b. Thus, ISO_obs contains effects of sneaking to the BS antenna 31a of the relay device 30a by a transmission wave transmitted from the MS antenna 32b of the relay device 30b. Then, the analysis unit 71a requests the generation unit 72a to stop the RF circuit at the relay device 30b in order to determine isolation (ISO_a) when there is no effect of the sneaking wave from the MS antenna 32b to the BS antenna 31a. In response to the request of the analysis unit 71a, the generation unit 72a generates a request signal (control=1) requesting to stop the RF circuit, and transmits to the relay device 30b via the communication unit 60a and so on (step S29).

In step S30, the analysis unit 71b of the relay device 30b acquires the content of the request signal via the communication unit 60b and so on, and determines that stop of signal input to the RF circuit is requested by the relay device 30a. Then, the analysis unit 71b stops signal input to the RF circuit. The analysis unit 71b notifies the generation unit 72b that the processing requested by the master-side relay device has been performed successfully. Then, the generation unit 72b generates a response signal (response information=2) representing success of the processing requested by the master-side relay device, and transmits to the relay device 30a via the communication unit 60b and so on (step S31).

In step S32, the analysis unit 71a of the relay device 30a acquires the response signal via the communication unit 60b and so on, and determines that the relay device 30b is in the RF OFF mode. Then, the analysis unit 71a acquires, from the calculation unit 55a, a calculation result (ISO_a) of the isolation between the BS antenna 31a and the MS antenna 32a. ISO_a represents the isolation of the relay device 30a when the relay device 30b is in the RF OFF mode. Thus, ISO_a does not contain effects due to sneaking to the BS antenna 31a of the relay device 30a by a transmission wave transmitted from the MS antenna 32b of the relay device 30b. The analysis unit 71a can evaluate, by using ISO_obs and ISO_a, an extent of sneaking to the BS antenna 31a by a transmission wave transmitted from the MS antenna 32b. That is, the analysis unit 71a can determine that smaller the difference between ISO_obs and ISO_a, less the effect of the wave sneaking from the MS antenna 32b to the BS antenna 31a. The analysis unit 71a stores the value of ISO_a for use to evaluate the effect of the sneaking wave between relay devices 30.

After successfully acquiring ISO_a, the analysis unit 71a request the generation unit 72a to restart signal input to the RF circuit by the relay device 30b in order to restart operation of the relay device 30b. Then, in response to the request of the analysis unit 71a, the generation unit 72a generates a request signal (control=2) requesting restart operation of the RF circuit, and transmits to the relay device 30b via the communication unit 60a and so on (step S33).

In step S34, the analysis unit 71b of the relay device 30b acquires the request signal via the communication unit 60b and so on, and determines that restart of signal input to the RF circuit is requested by the relay device 30a. Then, the analysis unit 71b restarts signal input to the RF circuit. The analysis unit 71b notifies the generation unit 72b that the processing requested by the master-side relay device has been performed successfully. Then, the generation unit 72b generates a response signal (response information=2) representing success of the processing requested by the master-side relay device, and transmits to the relay device 30a via the communication unit 60b and so on (step S35).

Figure 7A:
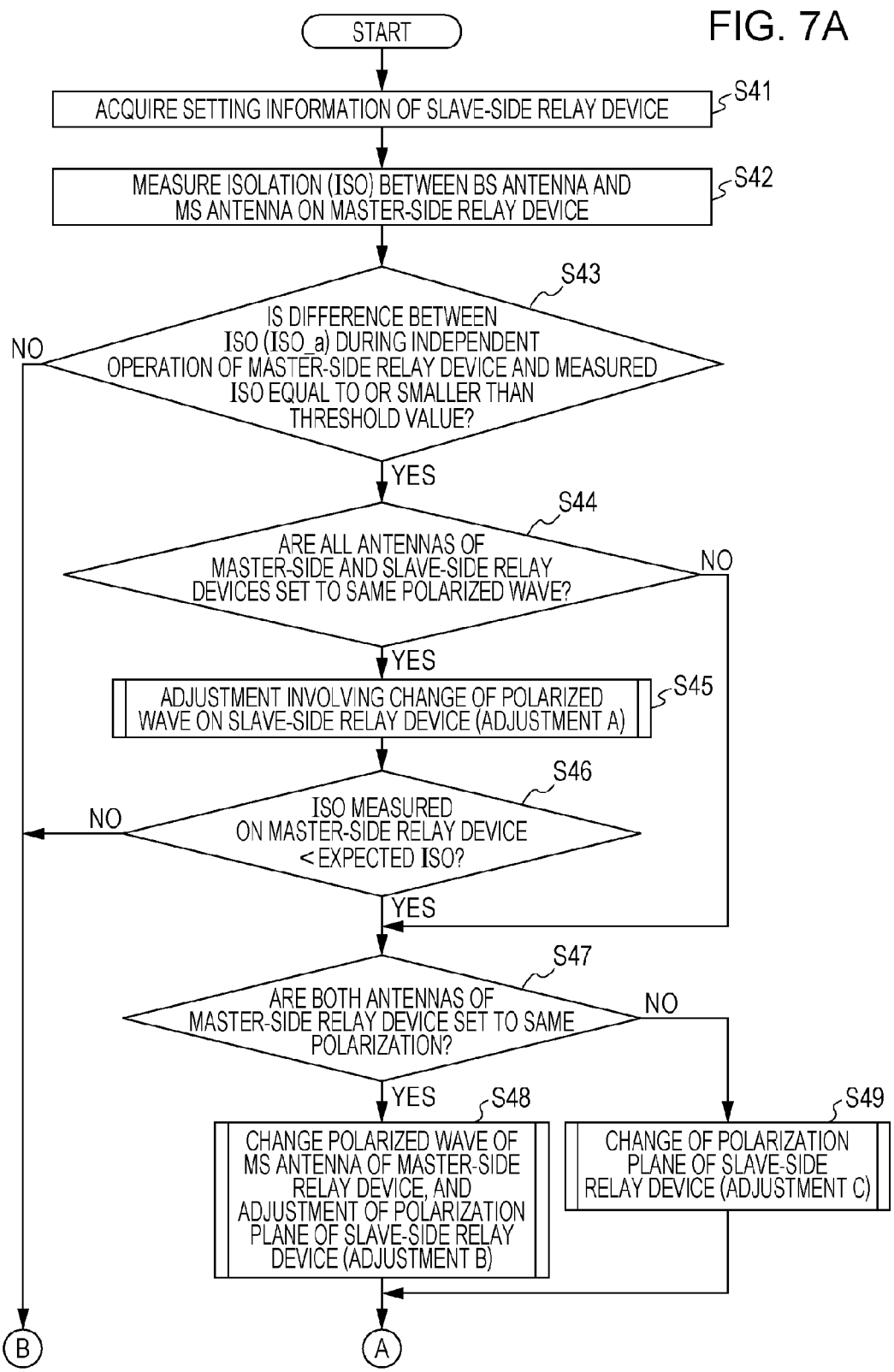
FIG. 7A is a flowchart for illustrating an example of a method of optimizing the setting of the relay device.
Figure 7B:
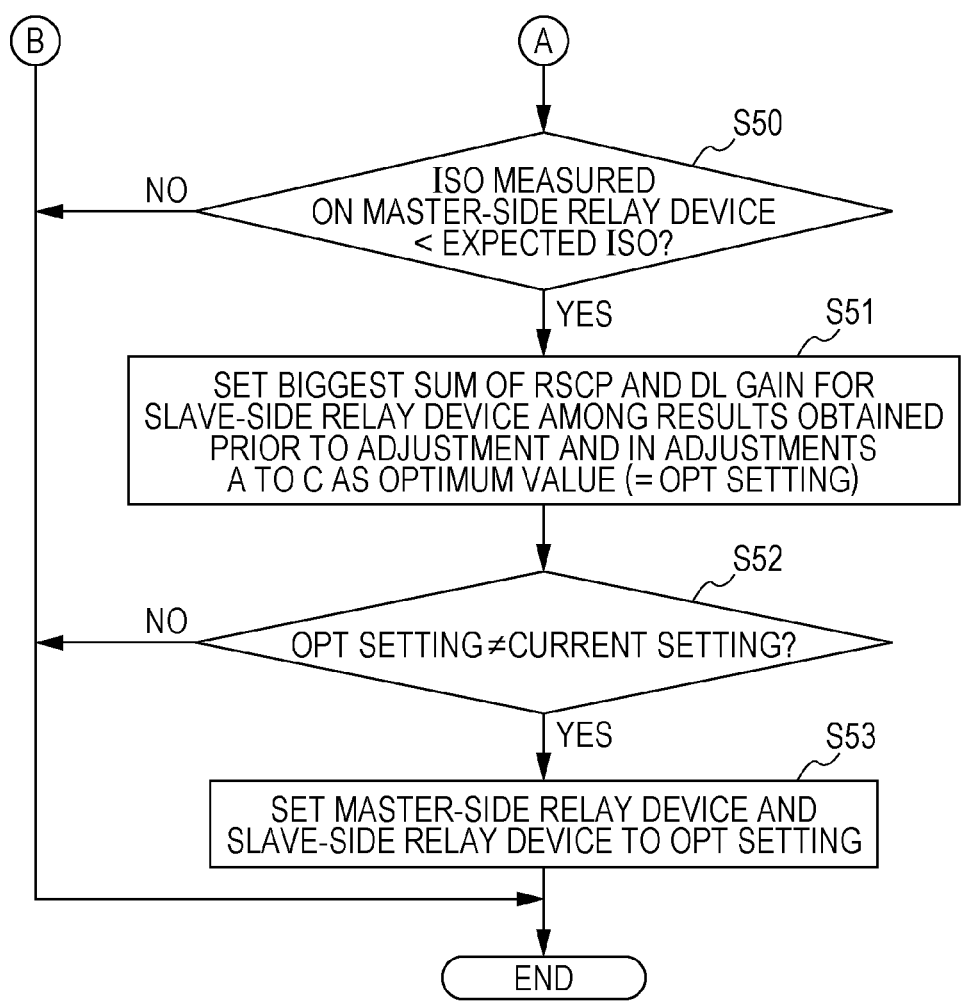
FIG. 7B is a flowchart for illustrating an example of a method of optimizing the setting of the relay device.

FIGS. 7A and 7B are flowcharts for illustrating an example of a method of optimizing the setting of the relay device 30. After completion of the processing described with reference to FIG. 5, processing illustrated in FIGS. 7A and 7B is performed. In the description below, the master-side relay device is the relay device 30a, and the slave-side relay device is the relay device 30b.

First, the analysis unit 71a of the master-side relay device acquires setting information of the slave-side relay device (step S41). At that time, the analysis unit 71a stores setting information of the master-side relay device and the slave-side relay device as initial values. Next, the calculation unit 55 in the master-side relay device measures isolation between the BS antenna 31 and the MS antenna 32 (step S42). In step S42, similarly with step S28 of FIG. 5, when both of the master-side relay device and the slave-side relay device are in operation, isolation between the BS antenna 31a and the MS antenna 32a of the master-side relay device is measured. Thus, the isolation measured in step S42 contains effects of the sneaking wave sneaking the BS antenna 31a of the master-side relay device from the MS antenna 32b of the slave-side relay device.

The analysis unit 71 of the master-side relay device pre-stores, according to procedures described with reference to steps S29 to S32 of FIG. 5, isolation (ISO_a) between the BS antenna 31a and the MS antenna 32a with the master-side relay device independently operated. Then, the analysis unit 71a of the master-side relay device evaluates an effect of the sneaking wave from the slave-side relay device by comparing a measured value determined in step S42 with ISO_a (step S43). When an absolute value of the difference between the measured value determined in step S42 and the isolation (ISO_a) during independent operation of the master-side relay device is equal to or smaller than the threshold value Th, the master-side relay device determines that adjustment between relay devices may not be performed (No in step S43), and ends processing. In other words, when an absolute value of the difference between a measured value of isolation on the master-side relay device with both master-side and slave-side relay devices in operation, and ISO_a is equal to or smaller than the threshold value Th, effects of the sneaking wave from the slave-side relay device are ignorable. That is, the master-side relay device determines that effects of the sneaking wave on the communication of the terminal 20 communicating via the slave-side relay device are ignorable, and does not perform processing.

On the other hand, when effects of the sneaking wave from the slave-side relay device are not ignorable, the master-side relay device determines that communication status between the slave-side relay device and the terminal 20 may be deteriorated, or a communication area which the slave-side relay device can provide may be narrowed. Then, to determine an antenna to be adjusted, the analysis unit 71a of the master-side relay device determines whether all antennas of the master-side relay device and the slave-side relay device are set to the same polarized wave (step S44). If all antennas of the master-side relay device and the slave-side relay device are set to the same polarized wave, isolation between antennas can be improved by orthogonalizing the polarization plane of the BS antenna 31a of the master-side relay device and the polarization plane of the MS antenna 32b of the slave-side relay device to each other. For example, when all antennas of master-side and slave-side relay devices are set to the H polarization, the polarization plane of the BS antenna 31a of the master-side relay device and the polarization plane of the MS antenna 32b of the slave-side relay device become orthogonal to each other by setting the MS antenna 32b of the slave-side relay device to the V polarization. Thus, sneaking from the MS antenna 32b of the slave-side relay device to the BS antenna 31a of the master-side relay device could be mitigated. Therefore, when all antennas of master-side and slave-side relay devices are set to the same polarized wave, adjustment involving a change of the polarized wave on the slave-side relay device is performed (step S45, if Yes in step S44). In the processing of step S45 (Adjustment A), polarization planes of the BS antenna 31b and the MS antenna 32b of the slave-side relay device are also adjusted so as to become orthogonal to each other. After the slave-side relay device has orthogonalized polarization planes of the BS antenna 31b and the MS antenna 32b to each other, the analysis unit 71a of the master-side relay device acquires a measured value (measured ISO) of the isolation from the calculation unit 55a (step S46). If the measured ISO determined in step S45 is equal to or more than the expected ISO, the analysis unit 71a of the master-side relay device determines that antenna adjustment has been performed successfully (No in step S46), and ends processing.

If the measured ISO is less than the expected ISO (Yes in step S46) and all antennas of master-side and slave-side relay devices are not set to the same polarized wave (No in step S44), the analysis unit 71 determines whether antennas of the master-side relay device are set to the same polarized wave (step S47). If the BS antenna 31a and the MS antenna 32a of the master-side relay device are set to the same polarized wave, improvement of the isolation can be expected by orthogonalizing the BS antenna 31a and the MS antenna 32a of the master-side relay device to each other. Therefore, when the BS antenna 31a and the MS antenna 32a of the master-side relay device are set to the same polarized wave, the polarized wave of the MS antenna 32a of the master-side relay device is changed, and the slave-side relay device is adjusted (step S48, if Yes in step S47). Antenna adjustment of the slave-side relay device in step S45 is performed according to the result of the setting change on the master-side relay device. On the other hand, if the BS antenna 31a and the MS antenna 32a of the master-side relay device are not set to the same polarized wave, the polarization plane of the slave-side relay device is adjusted (step S49). Hereinafter, processing of step S48 may be referred to as Adjustment B, and processing of step S49 may be referred to as Adjustment C. After processing of step S48 or S49, the analysis unit 71a of the master-side relay device compares the measured value of the isolation and the expected ISO with each other (step S50). If the measured ISO is equal to or more than the expected ISO, the analysis unit 71a of the master-side relay device determines that antenna adjustment has been performed successfully (No in step S50), and ends processing.

In step S50, if the measured ISO is less than the expected ISO, the analysis unit 71a of the master-side relay device determines a biggest sum of RSCP and DL gain for the slave-side relay device among results obtained prior to the measurement and in Adjustments A to C, as the optimum value (step S51). As described later, in any of Adjustments A to C, setting information of adjusted master-side relay device and slave-side relay device are recorded in the storage unit 73a by associating with the adjustment type. If a setting determined as the optimum value (OPT setting) is same as the present setting, the analysis unit 71 determines that the communication status is difficult to be further improved (No in step S52), and ends processing by. On the other hand, if the OPT setting is different from the present setting, analysis unit 71 sets the master-side relay device according to the OPT setting, and requests the generation unit 72a to notify the OPT setting to the slave-side relay device. The generation unit 72a generates a request signal containing the setting value of the OPT setting and information (control=3) indicating notification of the setting value, and transmits to the slave-side relay device. The analysis unit 71a of the slave-side relay device performs antenna adjustment according to the notification from the master-side relay device. As a result, both the master-side relay device and the slave-side relay device are set to the OPT setting (step S53).

FIG. 8 is a flowchart for illustrating an example of an adjustment involving a change of the polarized wave used on a slave-side relay device. FIG. 8 represents details of the processing performed in step S45 (Adjustment A) of FIG. 7A.

In step S61, the master-side relay device (relay device 30a) requests the slave-side relay device (relay device 30b) to change the polarized wave of the MS antenna 32b. In the processing of step S61, a generation unit 72a of the master-side relay device generates a request signal indicating information of control=6 (see Table T1 of FIG. 6) to change the polarized wave used for the MS antenna 32b of the slave-side relay device. When the request signal reaches the slave-side relay device from the generation unit 72a of the master-side relay device via the communication unit 60 and so on, an analysis unit 71b of the slave-side relay device determines that adjustment of the MS antenna 32b involving a change of the polarized wave of the MS antenna 32b is requested. Then, the analysis unit 71b notifies the adjustment unit 74b of the content of processing notified by the master-side relay device.

In step S62, the adjustment unit 74b changes the polarized wave of the MS antenna 32b by using the drive device 35b. For example, when the MS antenna 32b is set to the H polarization, the adjustment unit 74b adjusts the polarization plane of the MS antenna 32b by changing the setting of the MS antenna 32b to an angle using the V polarization. Here, as illustrated in FIG. 7A, processing of the adjustment A is performed when all antennas of the master-side relay device and the slave-side relay device have the same polarized wave. Therefore, in a case where processing of step S62 is performed, the BS antenna 31b and the MS antenna 32b have the same polarized wave before the MS antenna 32b is adjusted. Thus, in the processing in step S62, the MS antenna 32b is adjusted such that the BS antenna 31b and the MS antenna 32b use polarized waves different from each other. With a change of the polarized wave of the MS antenna 32b, a polarized wave of the reception signal of the BS antenna 31a of the master-side relay device, and a polarized wave of the transmission signal of the MS antenna 32b become different from each other. Thus, the processing in step S62 mitigates sneaking of the radio wave from the MS antenna 32b of the slave-side relay device to the BS antenna 31a of the master-side relay device.

After completion of the adjustment, the adjustment unit 74b notifies completion of the adjustment to the generation unit 72b. Then, the generation unit 72b generates a notification signal for notifying the status of the adjusted antenna to the master-side relay device. The notification signal generated here also contains information elements illustrated in F1 of FIG. 6. That is, the notification signal generated by the generation unit 72b contains information indicating that the transmission source relay device 30b is a slave station, polarized wave information of the BS antenna 31b and the MS antenna 32b, and so on. Since the communication unit 60b transmits the notification signal generated by the generation unit 72b via the antenna 61b, the slave-side relay device can notify information such as the setting of the BS antenna 31b and the MS antenna 32b to the master-side relay device (step S63).

Then, the calculation unit 55a of the master-side relay device measures isolation between the BS antenna 31a and the MS antenna 32a (step S64). The communication unit 60a stores information notified by the slave-side relay device into the storage unit 73a, and the analysis unit 71a stores information of the master-side relay device into the storage unit 73a. Thus, information of both the master-side relay device and the slave-side relay device is stored in the storage unit 73a (step S65).

FIG. 9 is a flowchart for illustrating an example of an adjustment involving a change of the polarized wave used in the master-side relay device. FIG. 9 represents details of the processing performed in step S48 (Adjustment B) of FIG. 7A.

In step S71, the analysis unit 71a of the master-side relay device determines to change a polarized wave of the transmission wave of the MS antenna 32a on the master-side relay device, and requests the adjustment unit 74a to change the polarized wave of the MS antenna 32a. The adjustment unit 74a adjusts the MS antenna 32a such that the polarization plane of the MS antenna 32a is orthogonal to the polarization plane of the BS antenna 31a. Thus, a polarized wave of the BS antenna 31a and a polarized wave of the MS antenna 32a become different from each other on the master-side relay device. After completion of the processing, the adjustment unit 74a notifies the completion of adjustment of the MS antenna 32a to the analysis unit 71a.

In step S72, the analysis unit 71a notifies the generation unit 72a that antenna adjustment according to the adjustment of the MS antenna 32a is requested to the slave-side relay device. Since the polarized wave of the MS antenna 32a of the master-side relay device is changed at this step, both the BS antenna 31b and the MS antenna 32b of the slave-side relay device are adjusted. Then, the generation unit 72a generates a request signal (control=7 in FIG. 6) containing the request to adjust the BS antenna 31b and the MS antenna 32b, and transmits to the slave-side relay device. This request signal is generated after changing the setting of the master-side relay device, and also used for notifying setting information of the master-side relay device.

In step S73, when the request signal reaches the slave-side relay device, the analysis unit 71b of the slave-side relay device determines that adjustment of the BS antenna 31b and the MS antenna 32b is requested due to adjustment of the MS antenna 32a of the master-side relay device. The adjustment unit 74b optimizes the polarization plane of the BS antenna 31b and the MS antenna 32b. At that time, the slave-side relay device may change the polarized wave of each antenna as appropriate. Processing of steps S74 to S76 is same as steps S63 to S65 described with reference to FIG. 8.

FIG. 10 is a flowchart for illustrating an example of adjusting the polarization plane on the slave-side relay device. FIG. 10 represents details of the processing performed in step S49 (Adjustment C) of FIG. 7A. Since in the situation where processing of step S49 is performed, there is less possibility that the communication status is improved by antenna adjustment of the master-side relay device, adjustment of polarization planes of the BS antenna 31 and the MS antenna 32 of the slave-side relay device is performed.

In step S81, the analysis unit 71a of the master-side relay device notifies the generation unit 72a that adjustment of the BS antenna 31b and the MS antenna 32b is requested to the slave-side relay device. The generation unit 72a generates a request signal (control=7 in FIG. 6) containing the request to adjust the BS antenna 31b and the MS antenna 32b, and transmits to the slave-side relay device. Processing of step S82 is the same as the processing of step S73 described with reference to FIG. 9, and processing of steps S83 to S85 is the same as processing of steps S63 to S65 described with reference to FIG. 8.

Figure 11B:
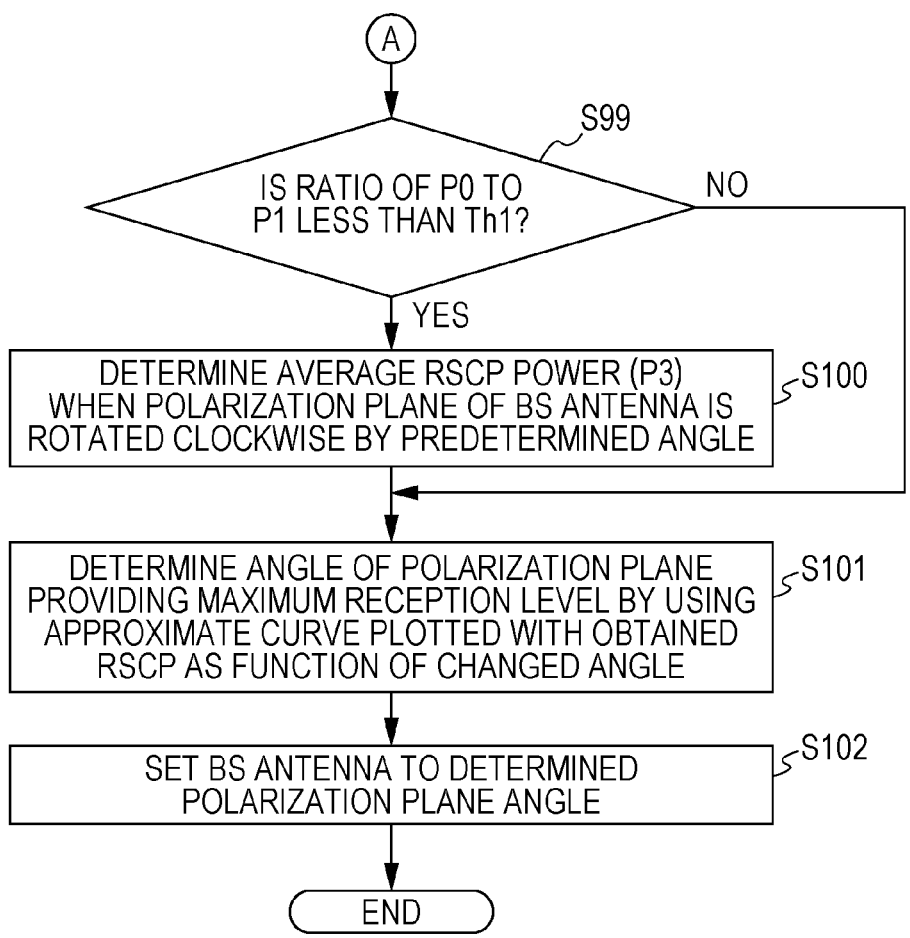
FIG. 11B is a flowchart for illustrating an example of an adjustment method of a BS antenna.

FIGS. 11A and 11B are flowcharts for illustrating an example of an adjustment method of the BS antenna 31. FIGS. 11A and 11B illustrate in detail an example of processing performed for adjustment of the BS antenna 31 upon activation of relay devices 30, and for adjustment of the BS antenna 31 by the slave-side relay device according to a request from the master-side relay device. FIGS. 11A and 11B illustrate just an example. For example, the number of measurement points used to generate an approximate curve plotting average values of RSCP as a function of the change amount of the antenna's polarization plane, and the sequence of determining RSCP at measurement points may be changed as desired according to the implementation.

The measuring unit 76 of a device adjusting the BS antenna 31 measures the RSCP power for a predetermined period of time to determine the average RSCP power (P0) (step S91). The measuring unit 76 records the value of the determined average RSCP power P0 into the storage unit 73, and requests the adjustment unit 74 to rotate the BS antenna 31 counterclockwise by a predetermined angle. In response to the request of the measuring unit 76, the adjustment unit 74 determines the average RSCP power (P−1) when the BS antenna 31 is rotated (step S92). The measuring unit 76 records the value of the average RSCP power (P−1) into the storage unit 73 by associating with a change amount of the angle of the BS antenna from the point of step S91. Further, the adjustment unit 74 rotates the BS antenna 31 counterclockwise by a predetermined angle, and the measuring unit 76 determines the average RSCP power (P−2) at this position (step S93). The value of the RSCP power (P−2) is also recorded into the storage unit 73 by associating with a change amount of the angle of the BS antenna from the point of step S91.

Next, the adjustment unit 74 determines whether the ratio of P0 to (P−1) is smaller than the threshold value Th1 (step S94). Here, the threshold value Th1 is a value as large as enough to determine whether there is a maximum value at a point counterclockwise from the measurement point of P0 on the approximate curve plotted with the average value of RSCP as a function of the change amount of the antenna's polarization plane. For example, when the threshold value Th1 is 3 dB, if the value of P0 relative to (P−1) is less than 3 dB, the adjustment unit 74 determines that there is a maximum value of the RSCP power at a position of the BS antenna 31 changed clockwise from the initial value on the approximate curve. Then, the adjustment unit 74 again rotates the BS antenna 31 counterclockwise by a predetermined angle, and the measuring unit 76 determines the average RSCP power (P−3) at this position (step S95, if Yes in step S94). The measuring unit 76 records the determined value into the storage unit 73, and notifies the adjustment unit 74 that counterclockwise measurement has ended. The adjustment unit 74 resets the value of the BS antenna to the initial value (step S96). When the ratio of P0 to (P−−1) is equal to or more than the threshold value, the adjustment unit 74 determines that there is no possibility of finding out a maximum value of the RSCP power even if the change amount of the BS antenna 31 is increased counterclockwise (No in step S94). Then, processing of steps S96 is performed.

In the same manner, similar processing is performed when angle of the polarization plane of the BS antenna 31 is changed clockwise. That is, the adjustment unit 74 rotates the BS antenna 31 clockwise by a predetermined angle, and the measuring unit 76 determines the average RSCP power (P1) at this position (step S97). Next, when the polarization plane of the BS antenna 31 is further rotated clockwise by a predetermined angle, the measuring unit 76 determines the average RSCP power (P2) (step S98). Values of both P1 and P2 are also recorded in the storage unit 73 by associating with the change amount of the angle from setting of the BS antenna 31 prior to adjustment thereof. Further, the adjustment unit 74 determines whether the ratio of P0 to (P1) is smaller than the threshold value Th1 (step S99). If the ratio of P0 to P1 is smaller than the threshold value Th1, the adjustment unit 74 determines that there is a possibility that a maximum value of the RSCP power can be found on the approximate curve by changing the value of the BS antenna 31 clockwise from the initial value. Then, the adjustment unit 74 again rotates the BS antenna 31 clockwise by a predetermined amount, and the measuring unit 76 determines the average RSCP power (P3) at this position (step S100, if Yes in step S99). The adjustment unit 74 determines the angle of the polarization plane providing a maximum reception level, by using an approximate curve plotted with the value of RSCP recorded in the storage unit 73 as a function of the changed angle of the BS antenna 31 (step S101). In step S101, the adjustment unit 74 deems the maximum value on the approximate curve as a maximum reception level. In step S99, even when the ratio of P0 to P1 is equal to or more than the threshold value Th1 (No in step S99), processing of step S101 is performed. In conjunction with the drive device 34, the adjustment unit 74 sets the BS antenna 31 to the polarization plane angle determined in step S101 (step S102).

Figure 12:
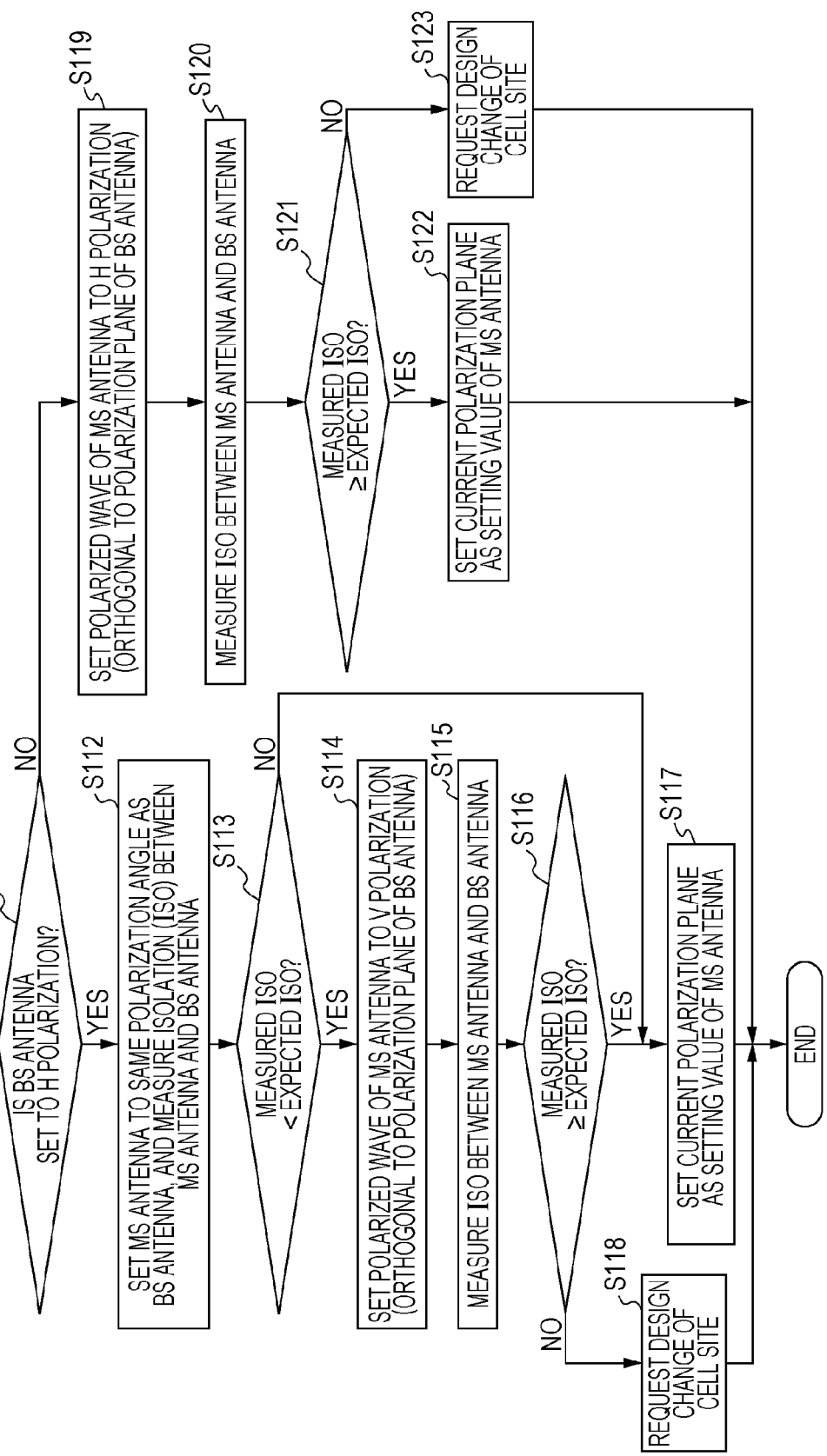
FIG. 12 is a flowchart for illustrating an example of an adjustment method of a MS antenna.

FIG. 12 is a flowchart for illustrating an example of adjustment method of the MS antenna 32. FIG. 12 illustrates in detail an example of processing performed for adjustment of the MS antenna 32 following adjustment of relay devices 30 and the BS antenna 31, and for adjustment of the MS antenna 32 by the slave-side relay device according to a request from the master-side relay device. FIG. 12 illustrates an example of processing performed when preferentially setting the H polarization to the MS antenna 32. When the V polarization is preferentially set to the MS antenna 32, there may be a change of processing sequence, such as, for example, execution of step S112 prior to steps S114 to S116.

Before starting adjustment of the MS antenna 32, the adjustment unit 74 determines whether the BS antenna 31 is set to the H polarization (step S111). If the BS antenna 31 uses the H polarization, the adjustment unit 74 sets the MS antenna 32 to the same polarization angle as the BS antenna 31. The calculation unit 55 calculates isolation between the BS antenna 31 and the MS antenna 32 (step S112). If the measured ISO is equal to or more than the expected ISO, the adjustment unit 74 ends processing with a current polarization plane as the setting value of the MS antenna 32 (step S117, if No at step S113).

If the measured ISO is less than the expected ISO, the adjustment unit 74 sets the polarized wave of the MS antenna 32 to the V polarization to make polarization planes of the BS antenna 31 and the MS antenna 32 orthogonal to each other (step S114, if Yes at step S113). The calculation unit 55 calculates isolation between the BS antenna 31 and the MS antenna 32 (step S115). If the measured ISO is equal to or more than the expected ISO, the adjustment unit 74 ends processing with a current polarization plane as the setting value of the MS antenna 32 (step S117, if Yes at step S116). On the other hand, if the measured ISO is less than the expected ISO, the adjustment unit 74 notifies a request for design change of the cell site, in a manner recognizable to the operator (step S118, if No at step S116).

On the other hand, if the BS antenna 31 receives the signal by using the V polarization, the adjustment unit 74 sets the MS antenna 32 such that the polarized wave thereof becomes the H polarization, in order to make polarization planes of the BS antenna 31 and the MS antenna 32 orthogonal to each other (step S119, if No at step S111). Then, processing of steps S120 to S123 is performed. The processing of steps S120 to S123 is same as the processing of steps S115 to S118.

Thus, in the first embodiment, when the communication status is deteriorated, the master-side relay device autonomously identifies the cause of the deterioration, and requests re-setting of the antenna, if the deterioration is due to setting of the slave-side relay device. In response to the request from the master-side relay device, the slave-side relay device resets the antenna of which setting is requested. Thus, in a system including multiple relay devices, deterioration of the communication status due to sneaking of the radio wave between relay devices is autonomously solved. Further, since effects of sneaking of the radio wave between relay devices is mitigated, interference effects is reduced without decreasing the gain, and as a result, the coverage of relay devices becomes larger.

Although for ease of explanation, the embodiment is described by citing a case where two relay devices in a system serve either as a master-side relay device or a slave-side relay device, the base station 10 and the terminal 20 may be relayed to each other via three or more relay devices 30. In this case, a relay device 30d serves as a slave-side relay device to a relay device 30c, and serves as a master-side relay device to a relay device 30e.

Even in a system installed by the method according to the first embodiment, communication status may be deteriorated due to an environmental change caused during operation. For example, when there is a rain fall or snow fall in the area where the system is installed, a deterioration of the path loss or a change of the polarization plane may occur due to rain or snow. Also, a tree growing in an area located between a relay device 30 and another relay device 30 may change the environment of the propagation path. In the second embodiment, an example of processing performed when communication unit is deteriorated due to an environmental change after starting the communication system is described.

Even in the second embodiment, the method of determining the master-side relay device and the slave-side relay device, and the communication method between relay devices 30 are the same as the methods of the first embodiment. In the second embodiment, even after operation has started, the master-side relay device and the slave-side relay device notify the setting status to each other when there is a change in the setting information or communication status. Information elements contained in a signal used for communication between relay devices 30 are same as those illustrated in FIG. 6. Further, the storage unit 73 of the master-side relay device can retain information of RSCP and isolation measured on the slave-side relay device for several minutes as desired by associating with the reception time, in addition to the latest report.

During operation of the system, the analysis unit 71 of the master-side relay device predicts communication status from RSCP of the master-side relay device via the slave-side relay device, RSCP of the slave-side relay device, isolation between antennas included in the slave-side relay device, and so on. On the other hand, when effects of the sneaking wave from the slave-side relay device are not ignorable, the master-side relay device determines that communication status between the slave-side relay device and the terminal 20 may be deteriorated, or a communication area which the slave-side relay device can provide may be narrowed. If isolation on the slave-side relay device becomes lower than the expected ISO, gain is reduced to suppress interference, and thereby a reachable range of the radio wave transmitted from the slave-side relay device may become narrower. Then, the analysis unit 71 of the master-side relay device determines to request antenna adjustment to the slave-side relay device, and identifies an antenna to be adjusted.

Figure 13:
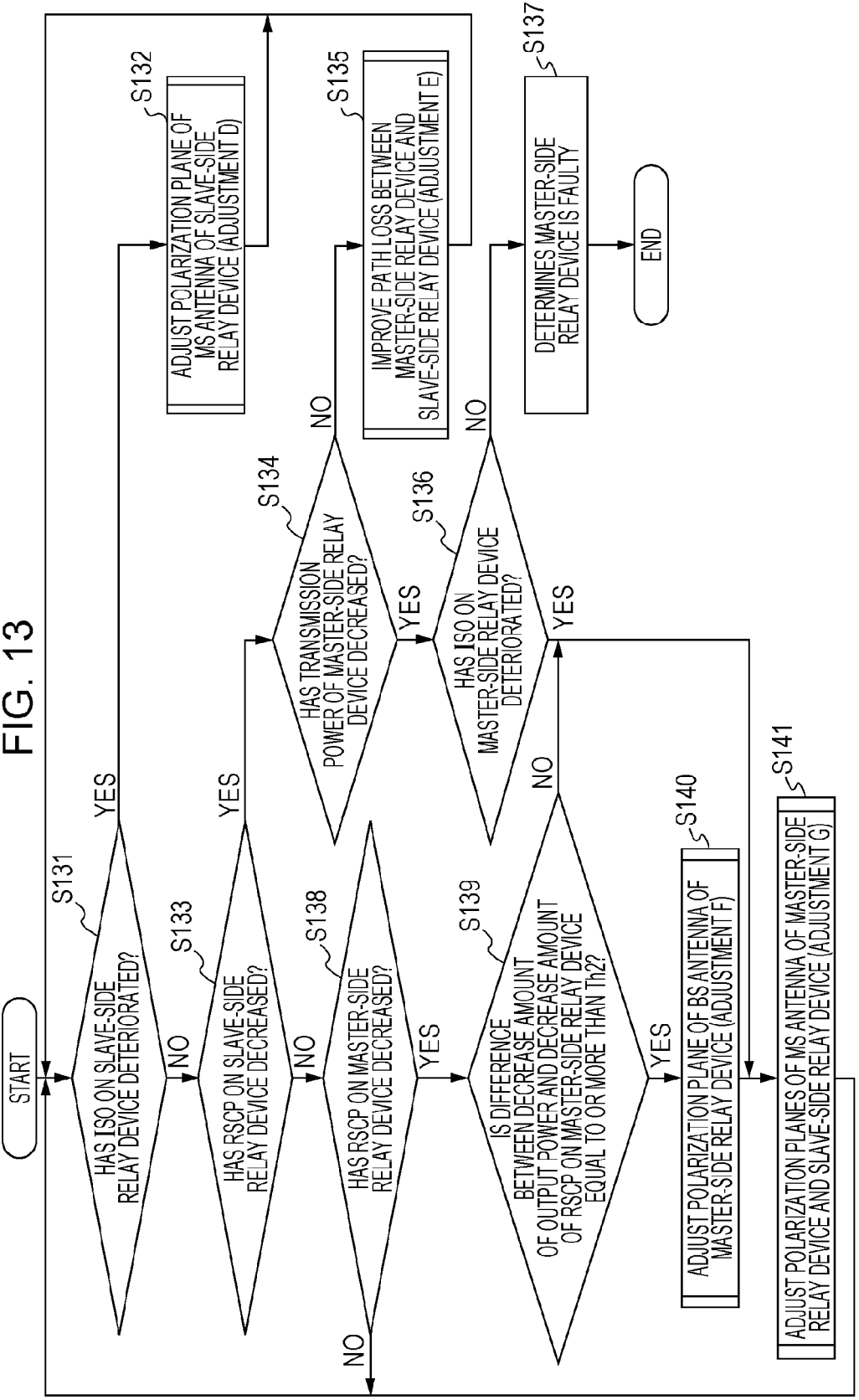
FIG. 13 is a flowchart for illustrating an example of a method of optimizing the setting of the relay device according to a change in the operating environment.

FIG. 13 is a flowchart for illustrating an example of a method of optimizing the setting of the relay device 30 according to a change of the operating environment. Even in the description below, to easily distinguish operations of the master-side relay device and the slave-side relay device from each other, the master-side relay device is referred to as the relay device 30a, and the slave-side relay device is referred to as the relay device 30b.

First, assume that the master-side relay device has received a notification signal including notification information and so on from the slave-side relay device. The analysis unit 71a of the master-side relay device compares the value of the isolation (ISO) on the slave-side relay device with previous data stored in the storage unit 73a and determines whether ISO on the slave-side relay device is affected (step S131). If ISO on the slave-side relay device is affected, adjustment (Adjustment D) of the polarization plane of the MS antenna 32b on the slave-side relay device is performed (step S132, if Yes in step S131). Detail of the adjustment of the polarization plane of the MS antenna 32b on the slave-side relay device is described with reference to FIG. 14. If the polarization plane of the MS antenna 32b is adjusted to improve the isolation of the slave-side relay device, the slave-side relay device notifies post-adjustment setting information to the master-side relay device, and processing of step S131 and subsequent steps are repeated.

If ISO on the slave-side relay device is not deteriorated, the analysis unit 71a determines by using information stored in the storage unit 73a whether RSCP on the slave-side relay device has decreased (step S133, if No in step S131). If RSCP on the slave-side relay device has decreased, the analysis unit 71a determines whether transmission power of the master-side relay device has decreased (step S134, if Yes in step S133). If transmission power of the master-side relay device has not decreased, processing (Adjustment E) for improving the path loss between the master-side relay device and the slave-side relay device is performed (step S135, if No in step S134). Detail of the Adjustment E is described with reference to FIG. 15. After completion of the processing for improving the path loss between the master-side relay device and the slave-side relay device, process of step S131 and subsequent steps is repeated.

If determined in step S134 that transmission power of the master-side relay device has decreased, the analysis unit 71a determines whether the isolation on the master-side relay device is deteriorated (step S136, if Yes in step S134). If the isolation on the master-side relay device is not deteriorated, the analysis unit 71a determines that the master-side relay device is faulty, and ends processing by alerting the operator as appropriate (step S137, if No in step S136). On the other hand, if the isolation on the master-side relay device is deteriorated, there is a significant effect of sneaking of the transmission wave (Yes in step S136). Then, the polarization planes of the MS antenna 32a of the master-side relay device, and the slave-side relay device are adjusted (Adjustment G) (step S141). Detail of the Adjustment G is described with reference to FIG. 17. After processing of step S141 ends, processing of step S131 and subsequent steps are repeated.

If determined in step S133 that RSCP on the slave-side relay device has not decreased, the analysis unit 71a determines whether RSCP on the master-side relay device has decreased (step S138, if No in step S133). If RSCP on the master-side relay device has not decreased, the analysis unit 71a determines that communication status is not deteriorated by an environmental change, and the process returns to step S131 (No in step S138).

On the other hand, if determined in step S138 that RSCP on the master-side relay device has decreased, the analysis unit 71a determines whether decrease amount of the output power and decrease amount of RSCP on the master-side relay device is the threshold value Th2 or less (step S139). If the decrease amount of the output power and RSCP of the master-side relay device is the threshold value Th2 or less, reception intensity of the transmission signal from the base station 10 may be low due to setting of the BS antenna 31a on the master-side relay device, the setting being not appropriate for the propagation path. Thus, when the decrease amount of the output power and RSCP of the master-side relay device is the threshold Th2 or less, polarization plane adjustment (Adjustment F) for the BS antenna 31a of the master-side relay device is performed by the adjustment unit 74a (step S140, if Yes in step S139). Adjustment F is described later with reference to FIG. 16. After processing of step S140, setting of the MS antenna 32a and antennas of the slave-side relay device are also changed according to the change of the setting of the BS antenna 31a (step S141).

Figure 14:
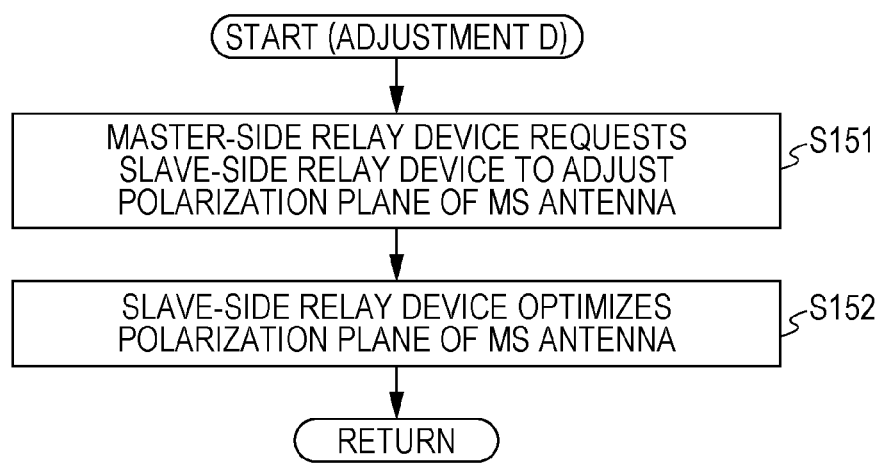
FIG. 14 is a flowchart for illustrating an example of adjusting a polarization plane on a slave-side relay device.

FIG. 14 is a flowchart for illustrating an example of adjusting the polarization plane on the slave-side relay device. FIG. 14 represents details of the processing performed in step S132 (Adjustment D) of FIG. 13. In step S151, the analysis unit 71a requests the generation unit 72a to request the slave-side relay device to adjust the polarization plane of the MS antenna 32b. In response to the request from the analysis unit 71a, the generation unit 72a generates a request signal (control=5, see Table T1 of FIG. 6) requesting the slave-side relay device to adjust the MS antenna 32b, and transmits to the slave-side relay device via the communication unit 60a. In step S152, when the slave-side relay device receives the request signal, the analysis unit 71b of the slave-side relay device notifies that adjustment of the MS antenna 32b has been requested. Then, the analysis unit 71b requests the adjustment unit 74b to perform adjustment of the MS antenna 32b. Adjustment processing of the MS antenna 32b is as described with reference to FIG. 12.

Figure 15:
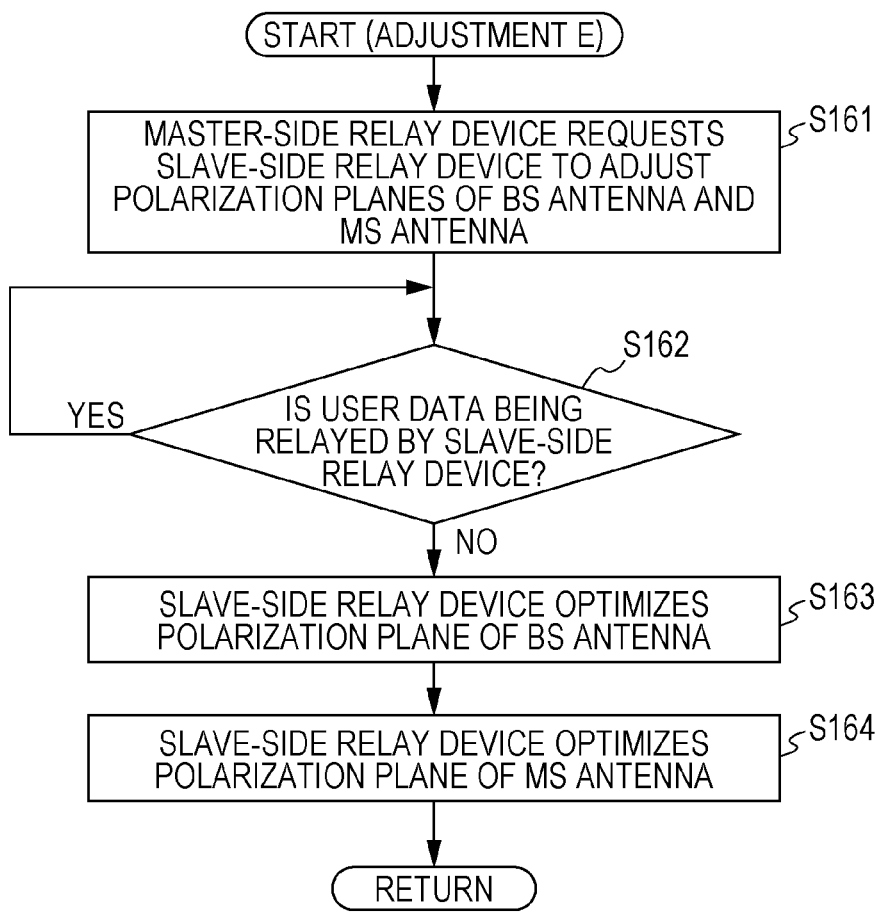
FIG. 15 is a flowchart for illustrating an example of mitigating a path loss between the master-side relay device and the slave-side relay device.

FIG. 15 is a flowchart for illustrating an example of mitigating a path loss between the master-side relay device and the slave-side relay device. FIG. 15 represents details of the processing performed in step S135 (Adjustment E) of FIG. 13.

In step S161, the analysis unit 71a requests the slave-side relay device to adjust the BS antenna 31b and the MS antenna 32b in order to improve path loss between the master-side relay device and the slave-side relay device. In response to the request from the analysis unit 71a, the generation unit 72a generates a request signal containing information (control=7) requesting the slave-side relay device to adjust the BS antenna 31b and the MS antenna 32b, and transmits to the slave-side relay device via the communication unit 60a and so on.

In step S162, when the slave-side relay device receives the request signal, the analysis unit 71b of the slave-side relay device notifies the adjustment unit 74b that adjustment of the BS antenna 31b and the MS antenna 32b has been requested. The adjustment unit 74b determines whether the slave-side relay device is relaying user data. Here, the adjustment unit 74b can determine whether user data is being relayed, for example, by checking whether the difference between the reception power and RSCP at the BS antenna 31b can be ignored. If the reception power at the BS antenna 31b is significantly higher than RSCP, the adjustment unit 74b determines that the slave-side relay device is relaying user data. If the slave-side relay device is relaying user data, the adjustment unit 74b waits without making adjustment of the antenna (step S162: Yes).

If the slave-side relay device is not relaying user data, the adjustment unit 74b adjusts the BS antenna 31b such that intensity of the reception power at the BS antenna 31b becomes higher (step S162: No). Adjustment processing of the BS antenna 31b is as described with reference to FIGS. 11A and 11B.

After adjustment of the BS antenna 31b has completed, the adjustment unit 74b adjusts the MS antenna 32b in accordance with the setting of the BS antenna 31b (step S164). Adjustment processing of the MS antenna 32b is as described with reference to FIG. 12.

Figure 16:
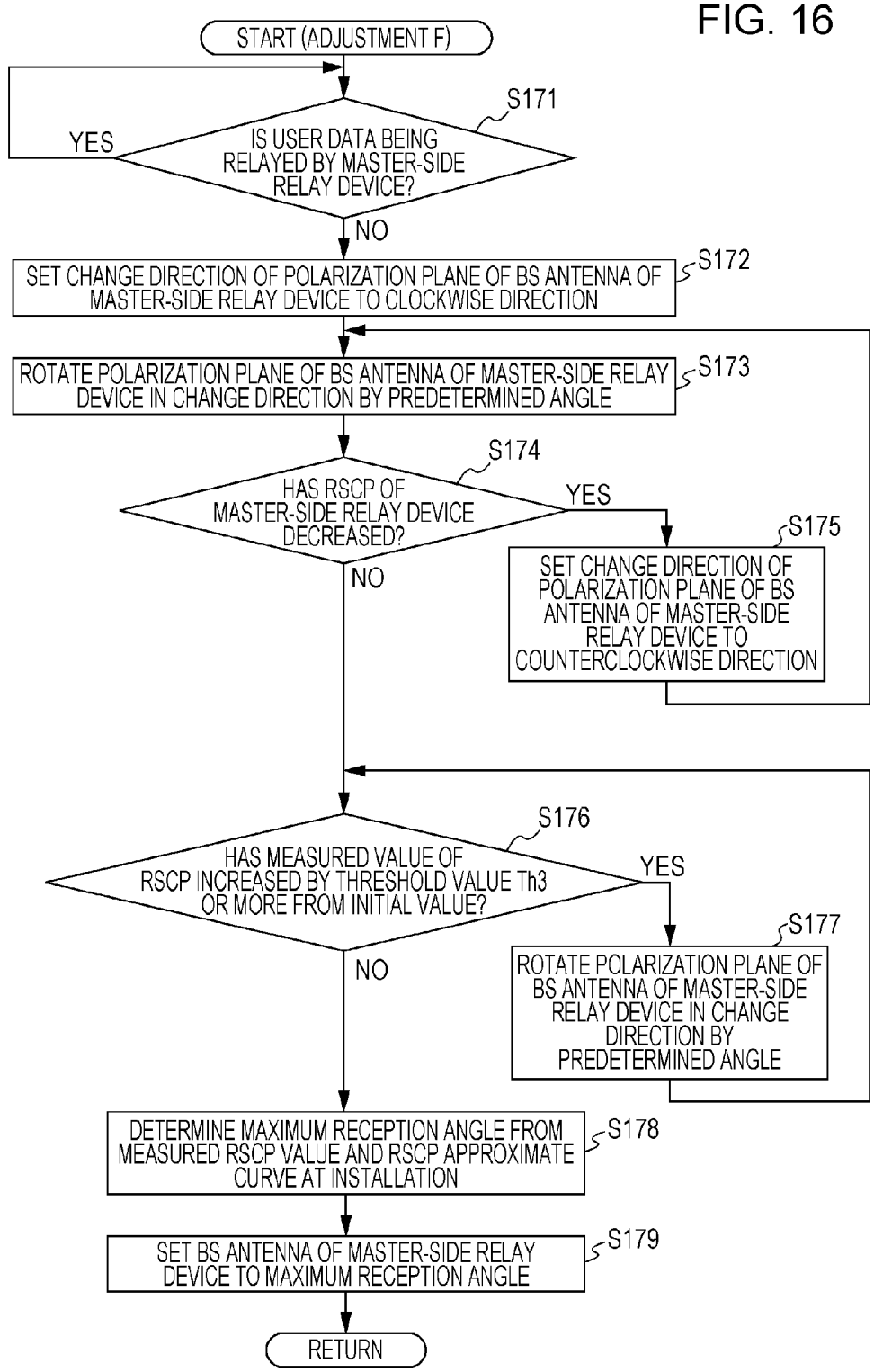
FIG. 16 is a flowchart for illustrating an example of adjustment of a BS antenna on a master-side relay device.

FIG. 16 is a flowchart for illustrating an example of adjustment of the BS antenna on the master-side relay device. FIG. 16 represents details of the processing performed in step S140 (Adjustment F) of FIG. 13. FIG. 16 illustrates an example. For example, change direction of the antenna polarization plane may be first set counterclockwise.

The adjustment unit 74a determines whether the master-side relay device is relaying user data (step S171). The adjustment unit 74a can determine whether user data is being relayed, in the same manner as the adjustment unit 74b. If the master-side relay device is relaying user data, the adjustment unit 74a waits without performing adjustment of the antenna (step S171: Yes). If the master-side relay device is not relaying user data, the adjustment unit 74a sets change direction of the polarization plane of the BS antenna 31a of the master-side relay device to the clockwise direction (step S172, if No at step S171). Then the adjustment unit 74a rotates the polarization plane of the BS antenna 31a in the change direction of the antenna polarization plane by a predetermined angle, and determines whether RSCP has decreased (steps S173 and S174). If RSCP has decreased, the adjustment unit 74b sets change direction of the polarization plane of the BS antenna 31a of the master-side relay device to the counterclockwise direction, and process returns to step S173 (step S175, if Yes in step S174). If determined in step S174 that RSCP has not decreased, the adjustment unit 74a determines whether the measured value of RSCP has increased by the threshold value of Th3 or more from the initial value (step S176, if No in step S174). The threshold value Th3 may be set, for example, to about 2 dB, although a value according to the implementation may be used. If change amount of RSCP is equal to or larger than the threshold value Th3, the adjustment unit 74a determines with an approximate curve generated at the time of setting that the difference from a maximum polarization angle of RSCP is large (Yes in step S176). Then the adjustment unit 74a rotates the polarization plane of the BS antenna 31a in the change direction of the antenna polarization plane by a predetermined angle, and returns to step S176 (step S177, if Yes in step S176).

On the other hand, if the change amount of RSCP is smaller than the threshold value Th3, the adjustment unit 74a determines with the approximate curve generated at the time of setting that the difference from a maximum polarization angle of RSCP is small (No in step S176). Then, the adjustment unit 74a determines a maximum reception angle from the measured RSCP value and the approximate curve at the setting (step S178). The adjustment unit 74a sets the BS antenna 31a of the master-side relay device to the maximum reception angle (step S179).

Figure 17:
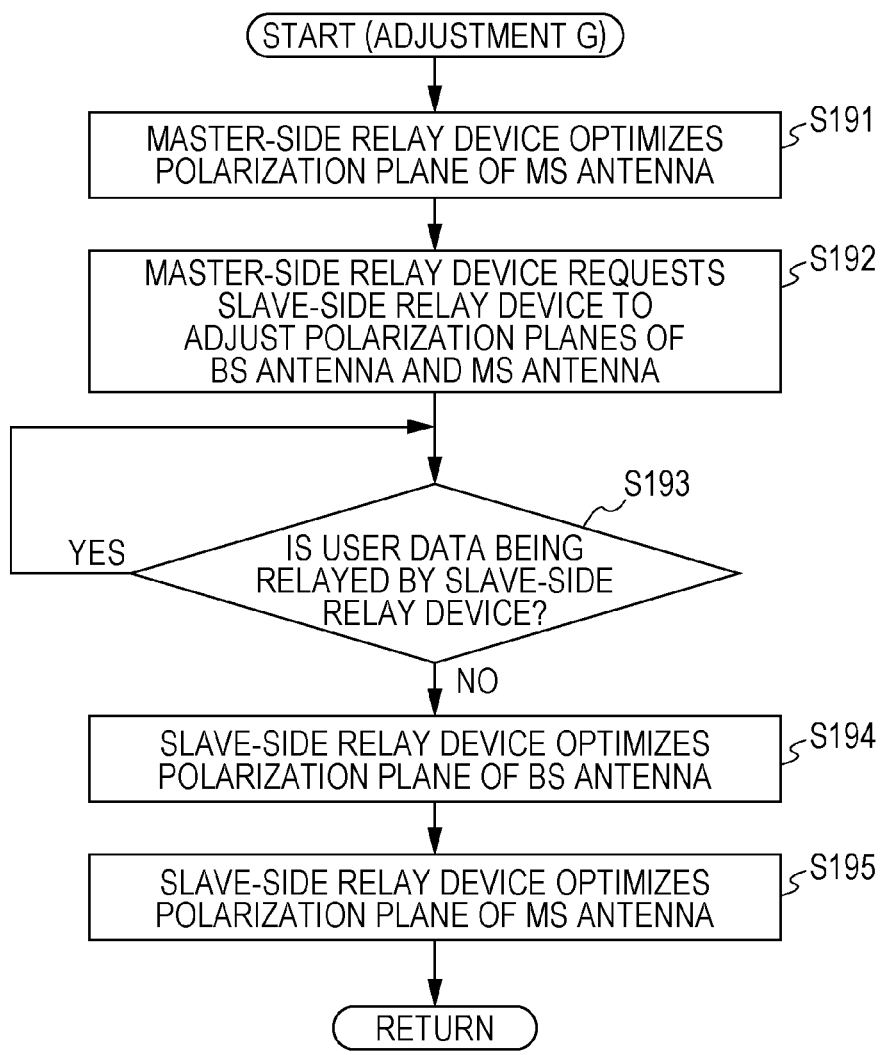
FIG. 17 is a flowchart for illustrating an example of adjusting a MS antenna and a slave-side relay device on a master-side relay device.

FIG. 17 is a flowchart for illustrating an example of adjustment of the MS antenna and the slave-side relay device on the master-side relay device. FIG. 17 represents details of the processing performed in step S141 (Adjustment G) of FIG. 13.

The adjustment unit 74a of the master-side relay device optimizes the polarization plane of the MS antenna 32a (step S191). Adjustment processing of the MS antenna 32a is as described with reference to FIG. 12. Processing of steps S192 to S195 is same as steps S161 to S164 described with reference to FIG. 15.

By the processing described above, relay devices are adjusted according to a change of the installation environment even when status of the propagation path changes due to an environmental change. Thus, drop of transmission power from the slave-side relay device and reduction of the area communicable via the slave-side relay device due to a change in the status of the propagation path can be suppressed.

Further, since those adjustments are performed autonomously between relay devices 30, management within the communication system is easy.

<Others>

Embodiments are not limited to the above, but various variations are possible. Some of the examples are described below.

Format of the signal used for communication between relay devices 30 is not limited to the format illustrated in FIG. 6, but may be modified according to the implementation. For example, if stop of notification of adjustment processing and setting status from the master-side relay device to the slave-side relay device is not requested, the value for performing standby control (control=4) may not be set.

Further when requesting the slave-side relay device to change the polarized wave of the MS antenna 32, the master-side relay device may use the setting value control (control=3) instead of a signal (control=6) for requesting the change of the polarized wave of the MS antenna 32. In this case, the generation unit 72 of the master-side relay device calculates the polarization plane of the MS antenna 32 orthogonal to the BS antenna 31 by using a setting value of the slave-side relay device stored in the storage unit 73. Then, the generation unit 72 requests the slave-side relay device to perform setting by using a request signal (control=3) to request setting to an obtained value.

Also, when requesting the slave-side relay device to change the polarized wave of the MS antenna 32, the master-side relay device may use the setting value control (control=3) and a signal (control=6) for requesting to change the polarized wave of the MS antenna 32. In this case, the analysis unit 71 of the slave-side relay device may determine whether content of the request signal from the master-side relay device is correct, by comparing a polarization angle determined from the signal for requesting to change the polarized wave of the MS antenna 32, and polarization information notified by the signal requesting the setting value control (control=3) with each other. If content of the request signal is wrong, the generation unit 72 notifies the master-side relay device of control disability (response=3) and the current setting of the slave-side relay device.

Further, in a processing using a value frequently changing by calculation, such as RSCP, an average value for a predetermined period of time may be used as appropriate even if not specified otherwise. For example, an average value for a predetermined time range may be used as the value of RSCP used at steps S133 and S139 of FIG. 13.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A relay device in a system in which a transmission signal of a base station is relayed via a plurality of relay devices, the relay device comprising:
a first antenna configured to receive the transmission signal;
a second antenna configured to communicate a target relay device being a relay destination relay device for the transmission signal;
a communication unit configured to perform notification of setting information of the first and second antennas to other relay devices including the target relay device, and communication for acquiring setting information of the other relay devices; and
an analysis unit configured to analyze a cause of a relay status lower than a criterion when the relay status of the transmission signal is lower than the criterion, the communication unit transmitting, to the target relay device, a request signal requesting adjustment of polarization planes of antennas connected with the target relay device when setting of the target relay device is the cause.

2. The relay device according to claim 1, further comprising:
a generation unit configured to generate the request signal, wherein
the communication unit receives, as setting information on the target relay device, information representing isolation between a third antenna and a fourth antenna which are used by the target relay device for reception of the transmission signal and for transmission of the transmission signal, respectively,
the analysis unit determines setting of a polarization plane of the fourth antenna as the cause when the isolation is lower than a threshold value, and
the generation unit generates a request signal for requesting the target relay device to change the polarization plane of the fourth antenna.

3. The relay device according to claim 1, further comprising:
a measuring unit configured to periodically measure a first reception power being a reception power of a predetermined control signal transmitted from the base station, wherein
the communication unit periodically receives, as setting information on the target relay device, a second reception power being a reception power of the control signal at the target relay device,
the analysis unit determines setting of polarization planes of the third and fourth antennas included in the target relay device as the cause if the second reception power decreases when there is no reduction of the first reception power and there is no reduction of the transmission power from the second antenna, and the request signal is a signal requesting the target relay device to change the polarization planes of the third and fourth antennas.

4. The relay device according to claim 1, further comprising:
an adjustment unit configured to adjust a polarization plane of the second antenna, wherein
the analysis unit identifies reduction of isolation between the first antenna and the second antenna as the cause when there is a reduction of transmission power from the second antenna,
the adjustment unit adjusts the polarization plane of the second antenna according to the first antenna,
the communication unit notifies a changed polarization plane of the second antenna to the target relay device, and
the request signal includes a request to change polarization planes of a third antenna and a fourth antenna which are used by the target relay device for reception of the transmission signal and for transmission of the transmission signal, respectively.

5. The relay device according to claim 2, further comprising:
a storage unit configured to hold a first value being isolation between the first antenna and the second antenna while the target relay device is not in operation; and
a calculation unit configured to calculate the isolation between the first antenna and the second antenna, wherein
the analysis unit
determines whether polarized waves of the first to fourth antennas are same when effects of a difference between a second value calculated by the calculation unit and the first value on relay status of the transmission signal are not ignorable, and
determines setting of the fourth antenna as the cause when the polarized waves of the first to fourth antenna are same, and
the generation unit generates, as the request signal, a signal requesting to orthogonalize the polarization plane of the fourth antenna to the polarization plane of the third antenna.

6. The relay device according to claim 5, wherein
the analysis unit
determines, when polarized waves of the first to fourth antennas are not identical, whether the polarized waves of the first antenna and the second antenna are same, and
determines setting of the second antenna as the cause if the polarized waves of the first antenna and the second antenna are same,
the adjustment unit orthogonalizes the polarization plane of the second antenna to the polarization plane of the first antenna, and
the generation unit generates a signal requesting adjustment of the polarization planes of the third and fourth antennas according to setting of the second antenna.

7. The relay device according to claim 1, further comprising:
a calculation unit configured to calculate isolation between the first antenna and the second antenna; and
an adjustment unit configured to adjust a polarization plane of the second antenna, wherein
when the communication unit receives a request to adjust the polarization plane of the second antenna from a request source device being a relay source relay device of the transmission signal, the adjustment unit adjusts the polarization plane of the second antenna such that the isolation between the first antenna and the second antenna becomes large, and
the communication unit notifies the request source device of information of the adjusted second antenna, and the isolation between the first antenna and the second antenna obtained after adjustment of the second antenna.

8. The relay device according to claim 7, wherein
the communication unit receives a request to adjust polarization planes of the first and second antennas from the request source device,
the adjustment unit
determines by using a value of reception power at the first antenna whether data to be transmitted to a terminal communicating with the base station is being relayed, and
adjusts the polarization planes of the first and second antennas such that isolation between the first antenna and the second antenna becomes large when the data to be transmitted to the terminal is not transferred, and
the communication unit notifies the request source device of information of the adjusted first and second antennas, and the isolation between the adjusted first and second antennas.

9. A method of adjusting a relay device in a system in which a transmission signal of a base station is relayed via a plurality of relay devices, the method performed by the relay device and comprising:
receiving the transmission signal by using a first antenna;
transmitting the transmission signal to a target relay device being a relay destination relay device for the transmission signal by using a second antenna;
performing, by using a communication device, notification of setting information of the first and second antennas to other relay devices including the target relay device, and communication for acquiring setting information of the other relay devices;
when relay status of the transmission signal is lower than a criterion, analyzing a cause of the relay status lower than the criterion; and
when setting of the target relay device is the cause, transmitting, to the target relay device, a request signal requesting adjustment of polarization planes of antennas included in the target relay device.

10. A relay device in a system in which a transmission signal of a base station is relayed via a plurality of relay devices, the relay device comprising:
a memory;
a first antenna configured to receive the transmission signal;
a second antenna configured to communicate a target relay device being a relay destination relay device for the transmission signal;
a communication unit configured to perform notification of setting information of the first and second antennas to other relay devices including the target relay device, and communication for acquiring setting information of the other relay devices; and
a processor coupled with the memory and configured to
analyze a cause of a relay status lower than a criterion when the relay status of the transmission signal is lower than the criterion, and
transmit, to the target relay device, a request signal requesting adjustment of polarization planes of antennas connected with the target relay device when setting of the target relay device is the cause.

* * * * *